(12) United States Patent
Montanari et al.

(10) Patent No.: US 12,531,575 B1
(45) Date of Patent: Jan. 20, 2026

(54) SYSTEMS AND METHODS FOR COMPRESSING STRUCTURED DATA VIA LATENT VARIABLE ESTIMATION

(71) Applicant: Granica Computing, Inc., Mountain View, CA (US)

(72) Inventors: Andrea Montanari, Stanford, CA (US); Joseph Gardi, Mountain View, CA (US); Eric Mclaughlin Weiner, Los Angeles, CA (US)

(73) Assignee: Granica Computing, Inc., Mountain View, CA (US)

( * ) Notice: Subject to any disclaimer, the term of this patent is extended or adjusted under 35 U.S.C. 154(b) by 188 days.

(21) Appl. No.: 18/407,006

(22) Filed: Jan. 8, 2024

Related U.S. Application Data

(60) Provisional application No. 63/479,636, filed on Jan. 12, 2023.

(51) Int. Cl.
H03M 7/30 (2006.01)

(52) U.S. Cl.
CPC ....... *H03M 7/3064* (2013.01); *H03M 7/6011* (2013.01)

(58) Field of Classification Search
CPC ..... H03M 7/30; H03M 7/3064; H03M 7/6011
See application file for complete search history.

(56) References Cited

U.S. PATENT DOCUMENTS

| | | | | |
|---|---|---|---|---|
| 7,243,341 B2* | 7/2007 | Murray | ............... | G06F 9/45508 717/136 |
| 8,706,749 B1* | 4/2014 | Klaren | ................ | G06F 16/88 707/805 |
| 8,751,687 B2* | 6/2014 | Nagy | ................. | H03M 7/3079 707/693 |
| 8,954,400 B2* | 2/2015 | Brown | .................. | H03M 7/30 707/693 |
| 9,477,927 B2* | 10/2016 | Snow | .................. | G06Q 10/04 |
| 9,881,254 B2* | 1/2018 | Kyle | ....................... | G06F 40/14 |
| 10,866,940 B2* | 12/2020 | Alsubaiee | .............. | G06F 16/81 |
| 11,068,468 B2* | 7/2021 | Pasini | ................ | G06F 16/2379 |
| 11,080,336 B2* | 8/2021 | Van Dusen | ............ | G06Q 50/01 |
| 11,157,705 B2* | 10/2021 | Wu | ........................ | G06F 40/30 |
| 11,328,000 B1* | 5/2022 | Whybark | ................ | G06F 16/86 |
| 11,416,526 B2* | 8/2022 | Chen | .................... | G06F 40/205 |

(Continued)

OTHER PUBLICATIONS

Altman, Erik R. Synthesizing Credit Card Transactions. Cornell University, arXiv Labs Oct. 4, 2019; [retrieved on Jun. 24, 2024]. Available at URL:https://arxiv.org/abs/1910.03033 pp. 1-7.

(Continued)

*Primary Examiner* — Lam T Mai
(74) *Attorney, Agent, or Firm* — WILSON SONSINI GOODRICH & ROSATI

(57) ABSTRACT

A computer-implemented method for compressing structured data or semi-structured data is provided. The method comprises: (a) estimating one or more latent variables associated with rows or columns of the structured data or semi-structured data; (b) partitioning the structured data or semi-structured data in one or more blocks according to the one or more one or more latent variables; (c) applying a sequential encoding algorithm to each of the blocks; and (d) appending a compressed encoding of the one or more latent variables.

20 Claims, 8 Drawing Sheets

---

Algorithm 1: Spectral latents estimation

Data: Data matrix $X^{m,n} \in \mathcal{X}^{m \times n}$; latents range $k = |\mathcal{L}|$; map $\psi : \mathcal{X} \to \mathbb{R}$

Result: Factors $u^m \in \mathcal{L}^m$, $v^n \in \mathcal{L}^n$

Compute top $(k-1)$ singular vectors of $M^{m,n} = \psi(X^{m,n})$, $(\tilde{a}_i)_{i \leq k-1}$, $(\tilde{b}_i)_{i \leq k-1}$;

Stack singular vectors in matrices $A = [\tilde{a}_1 | \ldots | \tilde{a}_{k-1}] \in \mathbb{R}^{m \times (k-1)}$, $B = [\tilde{b}_1 | \ldots | \tilde{b}_{k-1}] \in \mathbb{R}^{m \times (k-1)}$;

Let $(a_i)_{i \leq m}$, $a_i \in \mathbb{R}^{k-1}$ be the rows of $A$; $(b_i)_{i \leq n}$, $b \in \mathbb{R}^{k-1}$ the rows of $B$;

Apply KMeans to $(a_i)_{i \leq m}$; store the cluster labels as vector $u^m$;

Apply KMeans to $(b_i)_{i \leq n}$; store the cluster labels as vector $v^n$;

return $u^m, v^n$.

(56) References Cited

U.S. PATENT DOCUMENTS

| | | | | |
|---|---|---|---|---|
| 11,860,675 | B2* | 1/2024 | Jin | G06F 16/215 |
| 12,106,413 | B1* | 10/2024 | Mason | G06T 13/40 |
| 2004/0167907 | A1* | 8/2004 | Wakefield | G06F 16/30 |
| 2009/0300581 | A1* | 12/2009 | Triplett | G06F 8/436 |
| | | | | 717/112 |
| 2011/0153531 | A1* | 6/2011 | Ishizaki | G06F 40/149 |
| | | | | 706/12 |
| 2013/0332478 | A1* | 12/2013 | Bornea | G06F 16/211 |
| | | | | 707/763 |
| 2015/0294588 | A1* | 10/2015 | Kullok | G09B 7/02 |
| | | | | 434/236 |
| 2015/0294589 | A1* | 10/2015 | Kullok | A61B 5/743 |
| | | | | 434/236 |
| 2015/0294590 | A1* | 10/2015 | Kullok | G09B 5/02 |
| | | | | 434/236 |
| 2015/0294591 | A1* | 10/2015 | Kullok | A61B 5/4088 |
| | | | | 434/236 |
| 2018/0349461 | A1* | 12/2018 | Bhoovaraghavan | G06F 16/275 |
| 2021/0133204 | A1* | 5/2021 | Motamedi | G06F 16/282 |
| 2021/0133205 | A1* | 5/2021 | Motamedi | G06F 16/258 |
| 2022/0044121 | A1* | 2/2022 | Pituwalakankanamge | |
| | | | | G06N 3/045 |
| 2022/0342900 | A1* | 10/2022 | Basu | G06N 20/00 |
| 2023/0125621 | A1* | 4/2023 | Yu | G06N 20/00 |
| | | | | 382/159 |
| 2025/0159258 | A1* | 5/2025 | Esenlik | H04N 19/124 |
| 2025/0171017 | A1* | 5/2025 | Chen | B60W 30/18163 |
| 2025/0254308 | A1* | 8/2025 | Wang | G06N 3/0455 |

OTHER PUBLICATIONS

Business price indexes: Mar. 2022 quarter. Stats NZ, May 19, 2022 [retrieved on Jun. 24, 2024]. Available at URL:https://www.stats.govt.nz/information-releases/business-price-indexes-march-2022-quarter pp. 1-5.

Chen, et al. Data-aware low-rank compression for large NLP models. 35th Conference on Neural Information Processing Systems:1-14 (2021).

Cheng, et al. On the Compression of Low Rank Matrices, SIAM Journal on Scientific Computing 26(4):1389-1404 (2005).

Cover, et al. Elements of Information Theory. Wiley-Interscience (2006).

Frey, et al. Free Energy Coding, Proceedings of Data Compression Conference. IEEE: 73-81 (1996).

Goldberg, et al. Eigentaste: A Constant Time Collaborative Filtering Algorithm. Information Retrieval 4(2):133-151 (2001).

Hinton, et al. Autoencoders, Minimum Description Length and Helmholtz Free Energy. Proceedings of the 6th International Conference on Neural Information Processing Systems:3-10 (1993).

Hou, et al. Sparse Low-rank Matrix Approximation for Data Compression. IEEE Transactions on Circuits and Systems for Video Technology 27(5):1043-1054 (2015).

Li, et al. Tensor Completion for on-board Compression of Hyperspectral Images. IEEE International Conference on Image Processing: 517-520 (2010).

Phan, et al. Stable Low-Rank Tensor Decomposition for Compression of Convolutional Neural Network. European Conference on Computer Vision:522-539 (2020).

Salomon, David. Data Compression: the Complete Reference. Springer Science and Business Media: 1-902 (2004).

Taylor, Peter R. Lossless Compression of Wave Function Information Using Matrix Factorization: a "Gzip" for Quantum Chemistry. The Journal of Chemical Physics 139:074113, 1-14 (2013).

TLC Trip Record Data: NYC Taxi and Limousine Commission (2022). Available at URL:https://www.nyc.gov/site/tlc/about/tlc-trip-record-data.page.

Townsend, et al. Hilloc: Lossless Image Compression with Hierarchical Latent Variable Models. International Conference on Learning Representations, ICLR: 1-14 (2020).

Townsend, et al. Practical lossless compression with latent variables using bits back coding. 7th International Conference on Learning Representations:1-13 (2019).

Yuan, et al. Projective Nonnegative Matrix Factorization for Image Compression and Feature Extraction. 14th Scandinavian Conference Lecture Notes in Computer Science:333-342 (2005).

* cited by examiner

Algorithm 1: Spectral latents estimation

Data: Data matrix $X^{m,n} \in \mathcal{X}^{m \times n}$; latents range $k = |\mathcal{L}|$; map $\psi : \mathcal{X} \to \mathbb{R}$

Result: Factors $u^m \in \mathcal{L}^m, v^n \in \mathcal{L}^n$

Compute top $(k-1)$ singular vectors of $M^{m,n} = \psi(X^{m,n})$, $(\tilde{a}_i)_{i \leq k-1}, (\tilde{b}_i)_{i \leq k-1}$;

Stack singular vectors in matrices $A = [\tilde{a}_1| \ldots |\tilde{a}_{k-1}] \in \mathbb{R}^{m \times (k-1)}$,
$B = [\tilde{b}_1| \ldots |\tilde{b}_{k-1}] \in \mathbb{R}^{m \times (k-1)}$;

Let $(a_i)_{i \leq m}, a_i \in \mathbb{R}^{k-1}$ be the rows of $A$; $(b_i)_{i \leq n}, b \in \mathbb{R}^{k-1}$ the rows of $B$;

Apply KMeans to $(a_i)_{i \leq m}$; store the cluster labels as vector $u^m$;

Apply KMeans to $(b_i)_{i \leq n}$; store the cluster labels as vector $v^n$;

return $u^m, v^n$.

FIG. 1

| Data | Size | LZ | LZ (c) | ANS | Latent | Latent + LZ | Latent + ANS |
|---|---|---|---|---|---|---|---|
| Taxicab | 380 KB | 0.41 | 0.44 | 0.43 | 0.48 | 0.48 | 0.54 |
| FB Network 1 | 13.6 KB | 0.63 | 0.63 | 0.76 | 0.58 | 0.58 | 0.78 |
| FB Network 2 | 68.1 KB | 0.44 | 0.44 | 0.57 | 0.64 | 0.64 | 0.75 |
| FB Network 3 | 75.4 KB | 0.59 | 0.59 | 0.75 | 0.69 | 0.69 | 0.80 |
| GP Network 1 | 172 KB | 0.46 | 0.46 | 0.65 | 0.58 | 0.58 | 0.70 |
| Forest | 6.10 MB | 0.47 | 0.66 | 0.47 | 0.65 | 0.65 | 0.48 |
| Forest (s) | 6.10 MB | 0.29 | 0.38 | 0.47 | 0.41 | 0.41 | 0.49 |
| Card Transactions | 123 MB | 0.5 | 0.72 | 0.29 | 0.72 | 0.72 | 0.30 |
| Card Transactions (s) | 123 MB | 0.03 | 0.21 | 0.29 | 0.20 | 0.20 | 0.30 |
| Business price index (s) | 153 KB | -0.03 | 0.20 | 0.28 | 0.22 | 0.22 | 0.35 |
| US Census | 43.9 MB | 0.38 | 0.31 | 0.47 | 0.52 | 0.52 | 0.62 |
| Jokes | 515 KB | -0.21 | -0.15 | 0.07 | -0.03 | -0.03 | 0.13 |

FIG. 2

Algorithm 2: Lempel-Ziv

Data: Data $X^N \in \mathcal{X}^N$
Result: Binary string $Z \in \{0,1\}^*$ $k \leftarrow 1;$
while $k \leq N$ do
    if $\exists j < k : X_j == X_k$ then
        $L_k \leftarrow \max\{\ell \geq 1 : \exists j \in \{1,\ldots,k-1\} \text{ s.t. } X_j^{j+\ell-1} = X_k^{k+\ell-1}\};$
        $T_k \leftarrow \min\{j \in \{1,\ldots,k-1\} \text{ s.t. } X_j^{j+L_k-1} = X_k^{k+L_k-1}\};$
    else
        $L_k \leftarrow 1;$
        $T_k \leftarrow (-X_k);$
    end
    $Z \leftarrow Z \oplus \text{plain}(T_k) \oplus \text{elias}(L_k);$
    $k \leftarrow k + L_k$
end
if $\text{len}(Z) \leq \text{len}(\text{plain}(X^N))$ then
    return $Z$
else
    return $\text{plain}(X^N)$
end

FIG. 4

SYSTEMS AND METHODS FOR COMPRESSING STRUCTURED DATA VIA LATENT VARIABLE ESTIMATION

CROSS-REFERENCE TO RELATED APPLICATIONS

This application claims priority to U.S. Provisional Application No. 63/479,636 filed on Jan. 12, 2023, which is incorporated by reference herein in its entirety.

BACKGROUND

Lossless compression can include a class of data compression that allows the original data to be reconstructed from the compressed data with no loss of information. Data in structured or semi-structured format, which can be used for analytics and machine learning, may take the form of tables with, e.g., categorical or numerical entries. Some methods of lossless compression may assume that data takes the form of a random vector such as $X^N = (X_1, X_2, \ldots, X_N)$ of length N with entries in a finite alphabet X. Under suitable ergodicity assumptions and using the Shannon-McMillan-Breiman theorem, the entropy per letter can converge to a limit as h: =μmN. $H(X^N)/N$. Universal coding schemes (e.g., Lempel-Ziv coding) may not require knowledge of the distribution of $X^N$ and can encode such a sequence without information loss using (e.g., asymptotically) h bits per symbol. While this theory can be mathematically useful, its modeling assumptions (e.g., stationarity, ergodicity, asymptotia, and the like) may not be satisfied by actual data in many applications such as numerical analysis applications, hyperspectral imaging, image processing, quantum chemistry, large language models compression, and the like.

SUMMARY

In an aspect, disclosed herein is a computer-implemented method for compressing structured data or semi-structured data, comprising: (a) estimating latent variables associated with rows or columns of the structured data or semi-structured data; (b) partitioning the structured data or the semi-structured data into one or more blocks according to the latent variables; (c) applying a sequential encoding algorithm to each of the one or more blocks; and (d) appending a compressed encoding of the latent variables to the compressed encoding of each of the one or more blocks.

In some embodiments, the latent variables comprise row latent variables associated with the rows and column latent variables associated with the columns.

In some embodiments, the latent variables are estimated utilizing a spectral clustering algorithm.

In some embodiments, the latent variables are estimated using side information.

In some embodiments, the side information comprises a column datatype, a column name, or a row name.

In some embodiments, the method further comprising, prior to (b), reordering the rows and columns of the structured data or semi-structured data based at least in part on the latent variables.

In some embodiments, the method further comprising, prior to (c), generating a serialized block vector for each of the one or more blocks.

In some embodiments, the sequential encoding algorithm is applied to each serialized block vector.

In some embodiments, applying the sequential encoding algorithm comprises applying a first base compressor to each serialized block vector and a second base compressor to a latent variables of each serialized block vector.

In some embodiments, the first base compressor and the second base compressor are different.

In some embodiments, the structured data or semi-structured data is associated with hyperspectral imaging, image processing, quantum chemistry, or large language models.

In some embodiments, the structured data or semi-structured data is associated with tabular data.

In some embodiments, the method achieves an optimal compression rate.

In some embodiments, the method reduces a compression rate by at least about 5% compared to frequency-based entropy encoders (ANS), Lempel-Ziv encoders, or finite-state encoders.

In another aspect, disclosed herein is a non-transitory computer readable medium comprising machine executable code that, upon execution by one or more computer processors, implements a lossless compression algorithm, comprising: (a) estimating latent variables associated with rows or columns of a structured data or semi-structured data; (b) partitioning the structured data or semi-structured data into one or more blocks according to the latent variables; (c) applying a sequential encoding algorithm to each of the one or more blocks; and (d) appending a compressed encoding of the latent variables to the compressed encoding of each of the one or more blocks.

In some embodiments, the latent variables comprise row latent variables associated with the rows and column latent variables associated with the columns.

In some embodiments, the latent variables are estimated utilizing a spectral clustering algorithm.

In some embodiments, the latent variables are estimated using side information.

In some embodiments, the side information comprises a column datatype, a column name, or a row name.

In some embodiments, the lossless compression algorithm further comprises, prior to (b), reordering the rows and columns of the structured data or semi-structured data based at least in part on the latent variables.

In some embodiments, the lossless compression algorithm further comprises, prior to (c), generating a serialized block vector for each of the one or more blocks.

In some embodiments, the sequential encoding algorithm is applied to each serialized block vector.

In some embodiments, wherein applying the sequential encoding algorithm comprises applying a first base compressor to each serialized block vector and a second base compressor to a latent variables of each serialized block vector.

In some embodiments, the first base compressor and the second base compressor are different.

In another aspect, disclosed herein is a computer program product for compressing structured data or semi-structured data, the computer program product comprising at least one non-transitory computer-readable medium having computer-readable program code portions embodied therein, the computer-readable program code portions comprising: an executable portion configured to estimate variables associated with rows or columns of the structured data or semi-structured data; an executable portion configured to partition the structured data or the semi-structured data into one or more blocks according to the latent variables; an executable portion configured to apply a sequential encoding algorithm to each of the one or more blocks; and an executable portion configured to append a compressed encoding of the latent variables to the compressed encoding of each of the one or more blocks.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 1 shows an example of a spectral clustering algorithm in the pseudo-code for estimating spectral latents, in accordance with some embodiments;

FIG. 2 shows an example of data reduction rate (DRR) using different datasets achieved by classical and latent-based compressors on real tabular data, in accordance with some embodiments. Datasets included Facebook (FB) Networks 1, 2, and 3, GP Network 1, Forest, Card Transactions, Business price index, US census, and Jokes. LZ refers to row-major order ZSTD, LZ (c) refers to column-major order ZSTD. KMeans was run on the data 5 times with random initializations finding the DRR each time and reporting the average. Datasets marked with(s) had rows randomly permuted (e.g., shuffled) before compressing. ZSTD generally refers to a Zstandard fast compression algorithm or method;

FIG. 4 shows an example of Lempel-Ziv algorithm, in accordance with some embodiments;

DETAILED DESCRIPTION

Figure 3A:
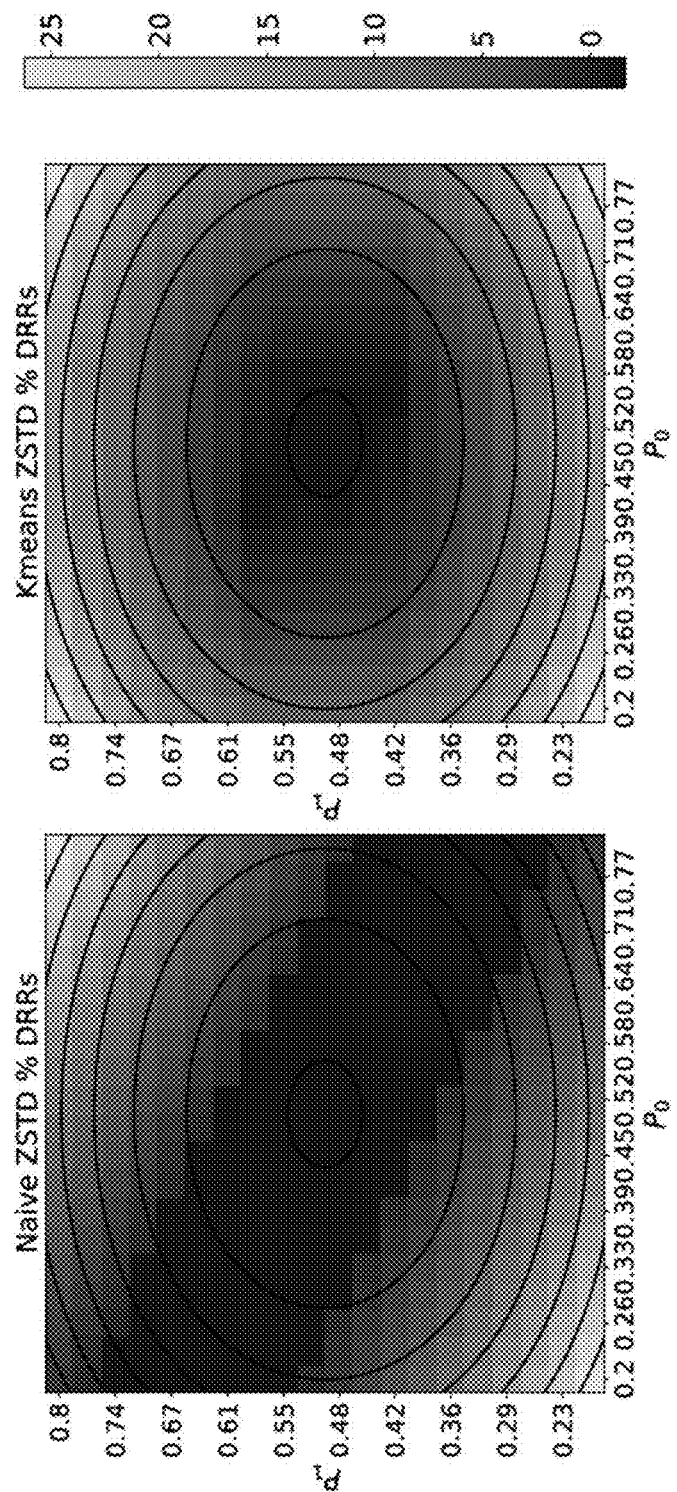
FIG. 3A shows a comparison of data reduction rate (DRR) of naive ZSTD coding and latent-based ZSTD coding for synthetically generated data, in accordance with some embodiments. ZSTD generally refers to a Zstandard fast compression algorithm or method.

The present disclosure provides improved methods for compressing structured data or semi-structured data. In some embodiments, the method comprises (a) estimating latent variables associated with rows or columns of the structured data or semi-structured data. In some embodiments, the method comprises (b) partitioning the structured data or the semi-structured data into one or more blocks according to the latent variables. In some embodiments, the method comprises (c) applying a sequential encoding algorithm to each of the one or more blocks. In some embodiments, the method comprises (d) appending a compressed encoding of the latent variables to the compressed encoding of each of the one or more blocks.

Overview

Data in structured or semi-structured format, which can be used for analytics and machine learning, may take the form of tables with, e.g., categorical or numerical entries. An unmet need exists for an improved lossless compression algorithm particularly for structured data or semi-structured data. The present disclosure provides systems and methods, which can improve the lossless compression performance over other methods or algorithms.

For example, the present disclosure provides a probabilistic model to identify optimal compression for data, e.g., structured or tabular data. In some cases, latent values can be independent and table entries can be conditionally independent given the latent values. The probabilistic model can be characterized with a well-defined entropy rate to determine the ideal compression rate and to satisfy an asymptotic equipartition property. By applying the probabilistic model to different datasets, the latent estimation approach disclosed herein can achieve the optimal rate. In contrast, other compression methods, e.g., Lempel-Ziv or finite-state encoders, may not be able to achieve the optimal rate.

In some cases, latent variables can be used in data compression methods based on machine learning and probabilistic modeling. Generally, latent variables in statistical models can include random variables that are unmeasured but may be unmeasurable. Latent variables can be included in statistical models for, in some cases, (1) including in the model features of interest that may not be directly measurable or were not measured; (2) constructing estimators that may be more efficient than those constructed from nonlatent variables models; and (3) constructing estimators of manipulation statistics that are unbiased.

For example, stochastically generated codewords (e.g., random latents) can lead to minimum description lengths via bits back coding. This method can be explicitly applied to lossless data compression using arithmetic coding or ANS coding. For example, data compression via low-rank approximation or latents-based approaches can be applied to numerical analysis applications, hyperspectral imaging, image processing (2D or 3D), quantum chemistry, large language or machine learning models, artificial intelligence (AI) models, audio processing, cryptography, genetics or genome data, and the like. However, some latents-based approaches may mainly center on lossy compression and do not precisely quantify compression rate, e.g., they do not 'count bits.'

The present disclosure can provide an improvement in lossless compression rate over other methods. For example, the present disclosure provides a family of lossless compression algorithms for data, e.g., structured or semi-structured data. In some embodiments, the methods herein may comprise: (i) estimating latent variables associated to rows and columns of the table; (ii) partitioning the table in blocks according to the row or column latents; (iii) applyig a sequential encoding algorithm (e.g., Lempel-Ziv compression or entropy coding) to each of the blocks; and (iv) appending a compressed encoding of the latent. Evaluation of the methods on several bench-mark datasets show that latent estimation and row or column reordering can improve compression rate.

In some cases, methods disclosed herein can improve upon mathematical algorithms, e.g., in compressing tabular data, by providing an asymptotically optimal algorithm that overcomes technical problems of other methods or algorithms. The lossless compression algorithms disclosed herein may be applied to various types of documents or data such as documents or data having comma-separated values (CSV) data, tab-separated values (TSV) data, Apache® Parquet data, Apache® optimized row columnar (ORC) data, Apache® Feather data, Microsoft® Excel (XLS) data, and the like. In some cases, the lossless compression algorithms disclosed herein may be applied to a document comprising semi-structured data (e.g., XML documents, JSON files, NoSQL databases, HTML code, graphs and tables, emails, etc.) or structured data (e.g., tabular data).

1 Introduction

Some methods of lossless compression may assume that data takes the form of a random vector $X^N=(X_1, X_2, \ldots, X_N)$ of length N with entries in a finite alphabet X. Under suitable ergodicity assumptions and using the Shannon-McMillan-Breiman theorem, the entropy per letter may converge to a limit as $h:=\lim_{N\to\infty}(X^N)/N$. Universal coding schemes (e.g., Lempel-Ziv coding) may not require knowledge of the distribution of $X^N$ and can encode such a sequence without information loss using (e.g., asymptotically) h bits per symbol. While this theory is mathematically useful, its modeling assumptions (e.g., stationarity, ergodicity, asymptotia, and the like) may not be satisfied by actual data in many applications.

For example, consider a data table with m rows and n columns and entries in $\mathcal{X}$, $X^{m,n} \in \mathcal{X}^{m \times n}$ $X^{m,n} := (X_{ij})_{i \leq m, j \leq n}$. An approach to such data can include: (i) serializing, e.g., in row-first order, to form a vector of length $N=mn$, $X^N=(X_{11}, X_{12}, \ldots, X_{1n}, X_{21}, \ldots, X_{mn})$ and (ii) applying a standard compressor (e.g., Lempel-Ziv) to this vector.

It can be shown, both empirically and mathematically, that such an approach can be suboptimal in the sense of not achieving the optimal compression rate, e.g., data reduction rate (DRR). This can happen even in the limit of large tables, as long as the number of columns and rows are polynomially related (e.g., $n^\varepsilon \leq m \leq n^M$) for some small constant $\varepsilon$ and large constant M).

Figure 6:
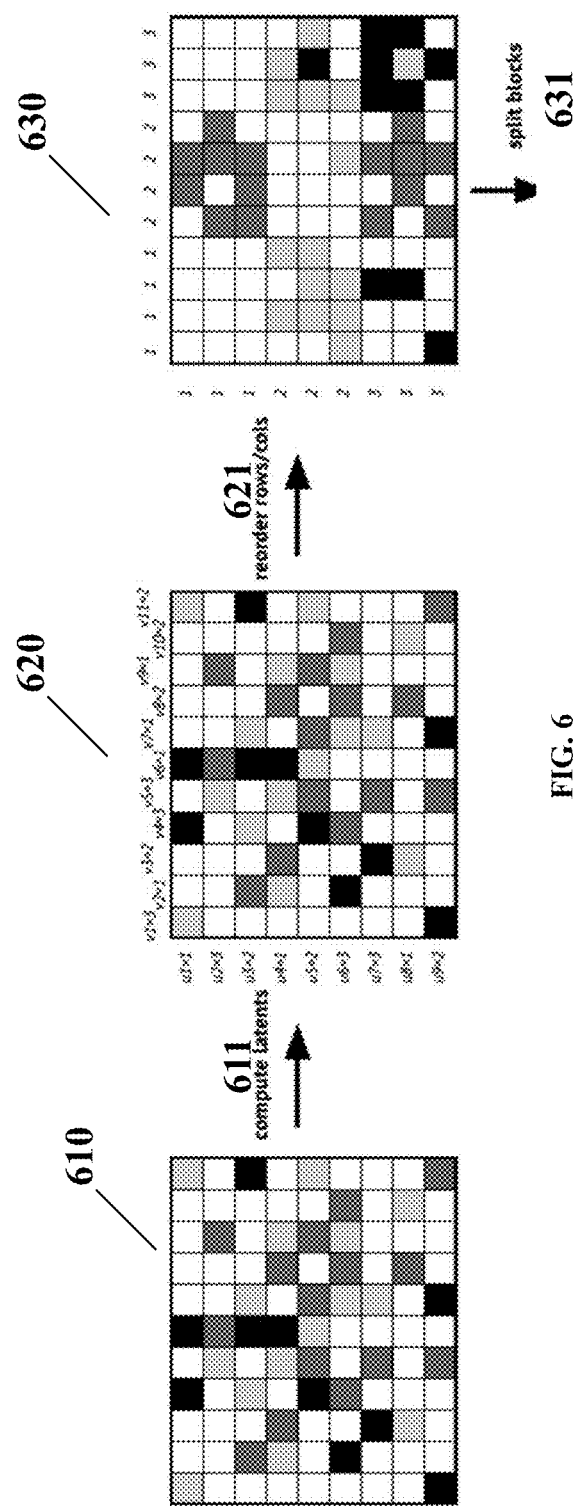
FIGS. 6-7 show an example of partitioning a table into blocks according to the latent variables, in accordance with some embodiments.
Figure 7:
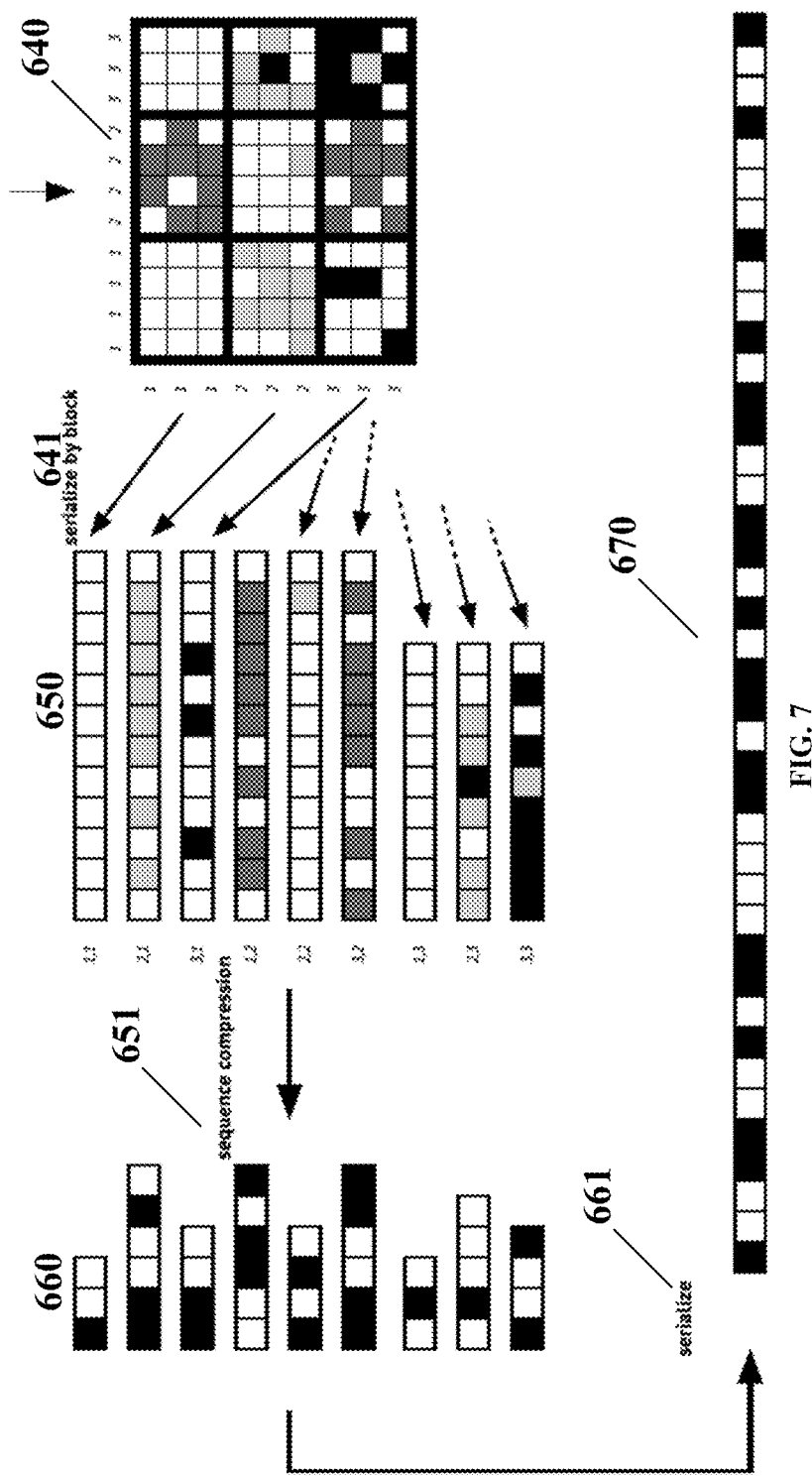

The present disclosure provides improved methods for compressing structured data or semi-structured data. In some cases, the method may use the following general scheme of operations 1, 2, and 3:

1. Estimating row latents $u^m=(u_1, \ldots, u_m) \in \mathcal{L}^m$ and column latents $v^n=(v_1, \ldots, v_n) \in \mathcal{L}^n$, with $\mathcal{L}$, a finite alphabet. For example, FIGS. 6-7 illustrate an example of applying the method to structured data in, e.g., a table. As illustrated in FIG. 6, latents 620, including the row latents and column latents, are computed 611 for the structured data, e.g., table 610. In some cases, the method may implement latents estimation using a spectral clustering algorithm or using side information, described herein elsewhere. Side information can include: columns datatype, column names, row names, and the like.

2. Partitioning the table in blocks according to the row or column latents. For example, for each pair of latents values $u, v \in \mathcal{L}$, let R(u) be the subset of rows with latent value $u_i=u$ and C(v) be the subset of columns with latent value $v_j=v$. Construct the table X_M (u, v) comprising the rows R (u) and columns C (v), in the same order as they appear in the original table. Then construct the vector or sequence X (u, v) by serializing X_M (u, v). In some cases, serializing the table may comprise scanning the entries of X_M (u, v) in row-first order or in column-first order. This operation can be performed by:

$$X(u, v) = vec(X_{ij} : u_i = u, v_j = v) \qquad \text{(Eq. 1.1)}$$

where vec (M) denote the serialization of matrix M (either row-wise or column-wise).

As illustrated in FIG. 6, constructing the table X_M (u, v) may include reordering rows 621 and columns 621 of the table 620 based on the latents to obtain a reordered table 630. Then, the reordered table 630 can be partitioned into blocks 631 based on the latents. For example, as illustrated in FIG. 7, the blocks may be partitioned based on the latent values. In some cases, the blocks may have variable sizes based on the reordered values of the latent variables. Next, the partitioned blocks in the table 640 may be serialized 641 to generate a plurality of vectors 650. Each vector may correspond to a block or be referred to as a serialized block vector X (u, v).

3. Applying a base compressor, which can be generically denoted by Zx: $\mathcal{X}^* \to \{0, 1\}^*$, to each block X (u, v):

$$z(u, v) = Z_X(X(u, v)), \forall u, v \in \mathcal{L} \qquad \text{(Eq. 1.2)}$$

4. Encoding the row latents and column latents using a possibly different compressor $Z_\mathcal{L}: \mathcal{X}^{**} \to \{0,1\}^*$, to get $z_{row}=Z_\mathcal{L}(u)$, $z_{col}=Z_\mathcal{L}(v)$. For example, as illustrated in FIG. 7, in the sequence compression 651, a base compressor such as sequence compression can be applied to the block vectors 651, and a compressor, which can be different than the base compressor, can be applied to the latents to obtain a plurality of compressed vectors 660. Considerations for selecting the base compressors are described herein elsewhere. Then, output the concatenation of all the above as:

$$Enc(X^{m,n}) = \text{header} \oplus z_{row} \oplus z_{col} \oplus_{u,v \in \mathcal{L}} z(u, v) \qquad \text{(Eq. 1.3)}$$

where $\oplus$ denotes concatenation, and header is a header that contains encodings of the lengths of subsequent segments (e.g., $|\mathcal{L}^n|^2+2$ integers). The compressed vectors 660 may then be serialized 661 or concatenated to form a final vector 670.

In some cases, encoding the latents can lead to a suboptimal compression rate. For example, techniques such as bits-back coding can merely yield limited improvement towards obtaining an optimal compression rate. It can be shown that the compression rate improvement achieved by such bits-back coding may only significant in certain special regimes, which is described herein elsewhere.

In some cases, methods described herein can leave several design choices undefined. For example, design choices can include: (1) the latents estimation procedure; (2) the base compressor $Z_x$ for the blocks $X(u, v)$; or (3) the base compressor $Z_\mathcal{L}$ for the latents. Implementation alongside empirical evaluation is described herein elsewhere.

2 Implementation

2.1 Base compressors

Dictionary-based compression (LZ). As an example, Zstandard (ZSTD) can be used in its Python implementation. ZSTD can implement a Lempel-Ziv style algorithm.

Frequency-based entropy coding (ANS). For each data portion (e.g., each block $X(u, v)$ and each of the row latents $u$ and column latents $v$), compute empirical frequencies of the corresponding symbols. For example, for all $u, v \in \mathcal{L}$, $x \in \mathcal{X}$, compute:

$$\hat{Q}(x|u,v) := \frac{1}{N(u,v)} \sum_{i:u_i=u} \sum_{j:v_j=v} 1_{x_{ij}=x}$$

$$\hat{r}(u) := \frac{1}{m} \sum_{i=1}^{m} 1_{u_i=u}, \text{ and}$$

where $N(u, v)$ is the number of i≤m, j≤n such that $u_i = u$, $v_j = v$. Apply ANS coding to each block X (u, v), modeling its entries as independent with distribution $\hat{Q}(\cdot|u, v)$, to the row latents $u^m$ using the distribution $\hat{r}(\cdot)$, and to the column latents $v^n$ using the distribution $\hat{c}(\cdot)$. Separately encode these counts as long integers and prepend them to the file. In some cases, they can be a negligible fraction of the file size.

2.2 Latent Estimation

In some cases, the method implements latents estimation using a spectral clustering algorithm. In some cases, the latents may be estimated using side information. Side information can include columns datatype, column names, row names, and the like. FIG. 1 shows an example of a spectral clustering algorithm in the pseudo-code.

In some cases, the algorithm may encode the data matrix $X^{m,n}$ as an $m \times n$ real-valued matrix $M^{m,n} \in \mathbb{R}^{m \times n}$ using a map $\psi: \mathcal{X} \to \mathbb{R}$. In some cases, this map may not be optimized. In some cases, the elements of $\mathcal{X}$ can be arbitrarily encoded as 0, 1, ... $|\mathcal{X}|-1$.

In some cases, the singular vector calculation can be the most time consuming part of the algorithm. Computing approximate singular vectors via power iteration can require at least log (m^n) matrix vector multiplications for each of k vectors. This can amount to mnk log (m^n) operations, which can be larger than the time needed to compress the blocks or to run KMeans. The methods disclosed herein can improve this to (mVn) klog (mVn) n) via subsampling operations, which are described herein elsewhere.

In some cases, for the spectral clustering operations, the method may use KMeans with k clusters, initialized randomly. For example, the algorithm may use the scikit-learn implementation via sklearn.cluster.KMeans. In some cases, the overall latent estimation approach may not estimate or make use of the model $Q(\cdot|u, v)$. In some cases, an alternative approach based on an expectation-maximization (EM) algorithm may use such an estimation.

3 Empirical Evaluation

Methods disclosed herein were evaluated on tabular datasets with different origins described below. The evaluation can be used to assess the impact of using latents in reordering columns and rows. In some cases, the evaluation may not attempt to achieve the best possible data reduction rate (DRR) on each dataset but rather to compare compression with latents and without latents. In some cases, the evaluation processed categorical variables by preprocessing the data to fit in this setting as described herein elsewhere. In some cases, the preprocessing included dropping some of the columns of the original table. The number of columns before preprocessing is denoted by $n_0$, and after by $n$. Differences between the implementation used in the evaluation and the methods described herein elsewhere are conceptually minor but can be practically important. Differences included: using different sizes for rows latent alphabet and column latent alphabet $|\mathcal{L}_r| \neq |\mathcal{L}_c|$ and choosing $|\mathcal{L}_r|, |\mathcal{L}_c|$ by optimizing compression size.

3.1 Datasets

The following datasets were utilized in the evaluation: taxicab, network, card transactions, business price index, forest, US census, and jokes.

Taxicab. This table has $m = 62,495$ rows, $n_0 = 20$ columns comprising data for taxi rides in New York City during January 2022. After preprocessing, this table had $n = 18$ columns. For the LZ (ZSTD) compressor, 9 row latents were used. For the ANS compressor, 8 row latents were used. Both methods used $n$ column latents with each column compressed separately.

Network. Four social networks from Stanford Network Analysis Platform (SNAP) Datasets, representing either friends as undirected edges for Facebook® (FB) or directed following relationships on Google® Plus (GP). It regards these as four distinct tables with 0-1 entries, with dimensions, respectively $m = n \in \{333, 747, 786, 1187\}$. For each table, the evaluation used 5 row latents and 5 column latents.

Card transactions. A table of simulated credit card transactions containing information like card ID, merchant city, zip code, etc. This table has $m = 24,386,900$ rows and $n_0 = 15$ columns. After preprocessing, the table had $n = 12$ columns. For this table, the evaluation used 3 row latents and n column latents.

Business price index. A table of the values of the consumer price index of various goods in New Zealand between 1996 and 2022. This table has $m = 72,750$ rows and $n_0 = 12$ columns from the Business price indexes: March 2022 quarter-CSV file. After preprocessing, this table had n=10 columns. Due to the highly correlated nature of consecutive rows, the data was shuffled before compressing. For the LZ method, the evaluation used 4 row latents. For the ANS method, the evaluation used 7 row latents. Both methods used $n$ column latents with each column compressed separately.

Forest. This table from the UC Irvine (UCI) Machine Learning Repository has $m = 581,011$ cartographic measurements with $n_0 = 55$ attributes, to predict forest cover type based on information gathered from US Geological Survey. The data contained binary qualitative variables and some continuous values like elevation and slope. After preprocessing, this data had $n = 55$ columns. For the LZ method, the evaluation used 9 row latents. For the ANS method, the evaluation used 8 row latents. Both methods used n column latents with each column compressed separately US Census. This table from the UCI Machine Learning Repository has $m = 2,458,285$ and $n_0 = 68$ categorical attributes related to demographic information, income, and occupation information. After preprocessing, this data had $n = 68$ columns. For this data, the evaluation used 9 row latents and n column latents.

Jokes. A table containing ratings of a series of jokes by 24,983 users collected between April 1999-May 2003. These ratings are real numbers on a scale from −10 to 10, and a value of 99 is given to jokes that were not rated. This table has $m = 23,983$ rows and $n_0 = 101$. The first column identifies how many jokes were rated by a user, and the rest of the columns contain the ratings. After preprocessing, this data had $n = 101$ columns, all quantized. For the LZ method, the evaluation used 2 row latents. For the ANS method, the evaluation used 5 row latents. Both methods used n column latents.

3.2 Preprocessing

Methods disclosed herein may preprocess different columns as follows: if a column comprises K≤256 unique values, then it maps the values to $\{0, \ldots, K-1\}$; if a column is numerical and comprises more than 256 unique values, the method may calculate the quartiles for the data and map each entry to its quartile membership (e.g., 0 for the lowest quartile, 1 for the next largest, 2 for the next, and 3 for the largest); and if a column does not meet either of the above criteria, it may be discarded.

In some evaluations, the data was randomly permuted before compression because some of the above datasets had rows already ordered in a way that can make nearby rows highly correlated.

3.3 Results

Given a lossless encoder $\phi: \mathcal{X}^{m \times n} \to \{0,1\}^*$, its compression rate and data reduction rate (DRR) can be defined as:

$$R_\phi(X^{m,n}) := \frac{\text{len}(\phi(X^{m,n}))}{mn \log_2 |\mathcal{X}|}, \quad DRR_\phi(X^{m,n}) := 1 - R_\phi(X^{m,n}) \quad \text{(Eq. 3.1)}$$

where larger DRR generally means better compression.

The DRR of each algorithm is illustrated in FIG. 2. Datasets included datasets described herein elsewhere, e.g., taxicab, network, card transactions, business price index, forest, US census, and jokes. For the table of results in FIG. 2, LZ refers to row-major order ZSTD, LZ (c) refers to column-major order ZSTD. KMeans was run on the data 5 times, with random initializations finding the DRR each time, and reporting the average. Data marked with (s) had rows randomly permuted (e.g., shuffled) before compressing. ZSTD generally refers to a Zstandard fast compression algorithm or method.

The results in FIG. 2 show that: (1) Latent+ANS encoders can achieve systematically the best DRR; (2) the use of latents in several cases can yield a DRR improvement of at least about 5% of the uncompressed size; and (3) this improvement is larger for data with a large number of columns, e.g., the network data of FB Network 1, FB Network 2, FB Network 3, and GP Network 1.

4 a Probabilistic Model

In order to better understand the technical problems of other approaches and the improved optimality of latent-based compression, the presented disclosure provides a probabilistic model for the table $X^{m,n} \in \mathcal{X}^{m \times n}$. The model assumes the true latents $(u_i)_{i \leq m}$, $(v_j)_{j \leq n}$ to be independent random variables with:

$$\mathbb{P}(u_i = u) = r(u), \mathbb{P}(v_i = v) = c(v) \quad \text{(Eq. 4.1)}$$

Also, the model assumes that the entries $(X_{ij})_{i \leq m, j \leq n}$ are conditionally independent given $u^m = (u_i)_{i \leq m}$, $v^n = (v_j)_{j \leq n}$, with:

$$\mathbb{P}(X_{ij} = x \mid u^m, v^n) = Q(x \mid u_i, v_j) \quad \text{(Eq. 4.2)}$$

The distributions r, c, and conditional distribution Q are parameters of the model with a total of $2(|\mathcal{L}|-1)+|\mathcal{L}|^2(|\mathcal{X}|-1)$ real parameters. In some cases, $(X^{m,n}, u^m, v^n) \sim \mathcal{T}(Q, r, c; m, n)$ can indicate that the triple $(X^{m,n}, u^m, v^n)$ is distributed according to the probabilistic model, occasionally omits a subset of the variables, and thus results as $(X^{m,n}) \sim \mathcal{T}(Q,r,c; m,n)$. In some cases, the statements may be non-asymptotic, in which case $m$, $n$, $\mathcal{X}$, $\mathcal{L}$, Q, r, c can be fixed. In some cases, the statements may be asymptotic, in which case a sequence of problems can be indexed by $n$.

FIG. 3A shows a comparison of data reduction rate (DRR) of naive ZSTD coding and latent-based ZSTD coding for synthetically generated data. Contour lines correspond to the information-theoretically optimal compression rate.

As an example of Symmetric Binary Model (SBM), the following SBM can be used, which parallels the symmetric stochastic block model for community detection. For example, take $\mathcal{L}=[k]:=\{1, \ldots, k\}$, $\mathcal{X}=\{0,1\}$, r=c=Unif([k]), the uniform distribution over [k], and $$Q(1 \mid u, v) = \begin{cases} p_1 & \text{if } u = v \\ p_0 & \text{if } u \neq v \end{cases} \quad \text{(Eq. 4.3)}$$

where $(X^{m,n}, u^m, v^n) \sim \mathcal{T}_{\text{SBM}}(p_0, p_1, k; m, n)$ when this distribution is used.

Figure 3B:
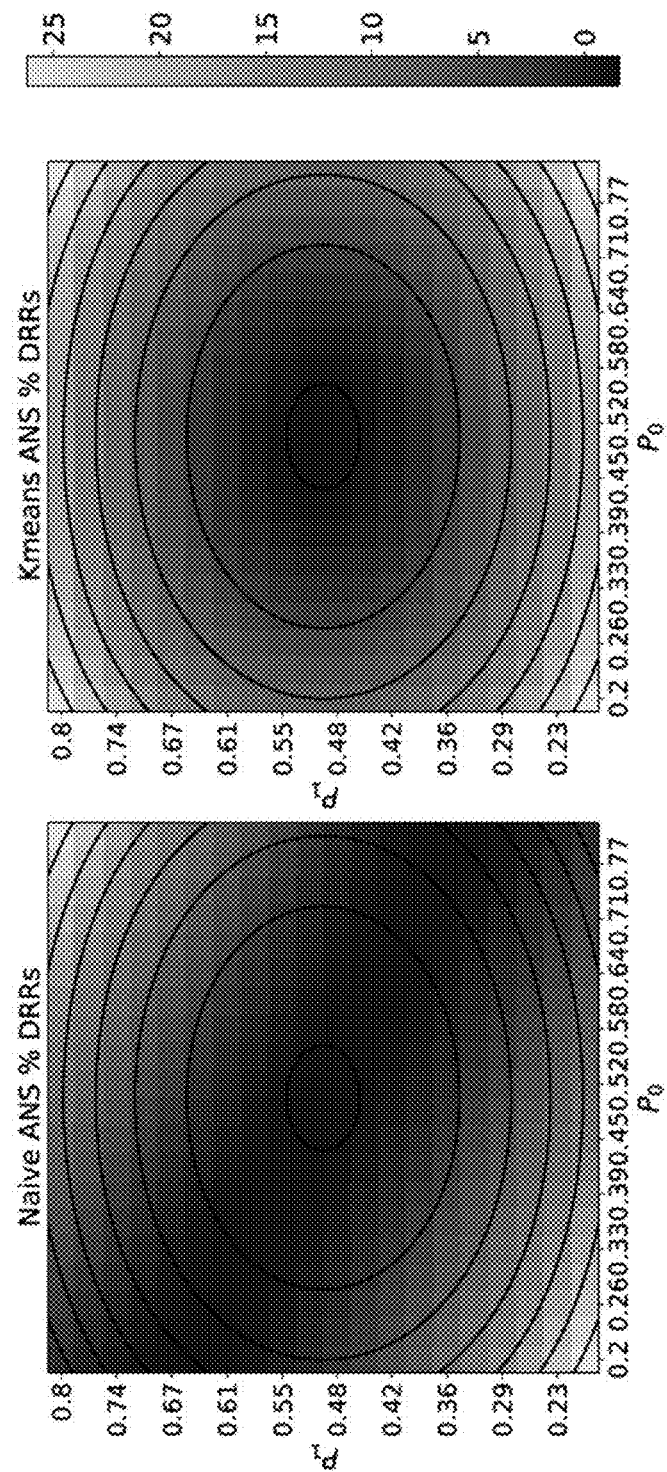
FIG. 3B shows comparison of data reduction rate (DRR) of naive ANS coding and latent-based asymmetric numeral systems (ANS) coding for synthetically generated data. Contour lines correspond to the information-theoretically optimal compression rate, in accordance with some embodiments.

FIG. 3A and FIG. 3B show the results of simulations within this model, respectively for ZSTD-based. In this case $m=n=1000$, k=3, and DRR values are averaged over 4 realizations. In some cases, the use of latents can be irrelevant along the line $p_1 \infty p_0$, which may not impact the distribution of $X_{ij}$. In some cases, the use of latents can become important when $p_1$ and $p_0$ are significantly different. FIG. 3B shows comparison of data reduction rate (DRR) of naive ANS coding and latent-based ANS coding for synthetically generated data. Contour lines correspond to the information-theoretically optimal compression rate.

5 Theoretical analysis

5.1 Ideal Compression

Lemma 5.1. A first theorem or lemma can provide upper and lower bounds on the entropy per symbol $H(X^{m,n})/mn$. The first lemma 5.1 can be shown as:

$$H(X \mid U, V) \leq \frac{1}{mn} H(X^{m,n}) \leq H(X \mid U, V) + \frac{1}{n} H(U) + \frac{1}{m} H(V) \quad \text{(Eq. 5.1)}$$

Further, for any estimators $\hat{u}: \mathcal{X}^{m \times n} \to \mathcal{L}^m$, $\hat{v}: \mathcal{X}^{m \times n} \to \mathcal{L}^n$ let $$\hat{A}_U := \min_{\pi \in \mathcal{GL}} \sum_{i=1}^m 1_{\hat{u}_i \neq \pi(u_i)}/m, \quad \hat{A}_V := \min_{\pi \in \mathcal{GL}} \sum_{i=1}^n 1_{\hat{v}_i \neq \pi(v_i)}/n$$

(the minimum is over permutations of the letters in $\mathcal{L}$). Letting $\varepsilon_U := \mathbb{E}\hat{A}_U$, $\varepsilon_V := \mathbb{E}\hat{A}_V$, the formula becomes:

$$H(X \mid U, V) + \frac{1}{n} H(U) + \frac{1}{m} H(V) - \delta_{m,n} \leq \quad \text{(Eq. 5.2)}$$

-continued $$\frac{1}{mn}H(X^{m,n}) \leq H(X \mid U, V) + \frac{1}{n}H(U) + \frac{1}{m}H(V)\delta_{m,n} :=$$

$$\frac{1}{n}[h(\varepsilon_U) + \varepsilon_u \log(|\mathcal{L}|-1)] + \frac{1}{m}[h(\varepsilon_V) + \varepsilon_V \log(|\mathcal{L}|-1)] \quad 5$$

Corollary 5.2. Recall the definition of compression rate from Eq. 3.1. Then, there may exist a lossless compressor Ø such that:

$$\mathbb{E}R_\phi(X^{m,n}) \leq \frac{1}{\log_2|\mathcal{X}|} \left\{ H(X \mid U, V) + \frac{1}{n}H(U) + \frac{1}{m}H(V) + \frac{1}{mn} \right\} \quad \text{(Eq. 5.3)}$$

Further, for any lossless compressor φ, $\mathbb{E}R_\phi(X^{m,n}) \geq$ H(X|U,V)+H(U)/$n$ )+H($v$ )/m−$\delta_{m,n}$−2 log$_2$($mn$)/$mn$.

The simpler bound of Eq. 5.1 may imply that the entropy per entry is H(X|U, V)+O(1/$m \wedge n$ )). The operational interpretation of this result can be that it should be able to achieve the same compression rate per symbol as if the latents were given.

The additional terms $$\frac{1}{n}H(U) + \frac{1}{m}H(V)$$

in Eq. 5.2 can account for the additional memory required for the latents. The lower bound in Eq. 5.2 may imply that, if the latents can be accurately estimated from the data $X^{m,n}$ (e.g., if $\varepsilon_U$, $\varepsilon_v$ are small), then this overhead can be essentially or substantially unavoidable.

The nearly ideal compression rate in Eq. 5.3 can be achieved by Huffmann or arithmetic coding, which may require knowledge of the probability distribution of $X^{m,n}$. Under these schemes, the length of the codeword associated to $X^{m,n}$ is within a constant number of bits from $-\log_2$ P($X^{m,n}$), where P(X$_0$):=$\mathbb{P}$ ($X^{m,n}$=X$_0$) is the probability mass function of the random table $X^{m,n}$. The next lemma 5.3 may imply that the length concentrates tightly around the entropy.

Lemma 5.3. Asymptotic Equipartition Property. For X$_0 \in \mathcal{X}^{m \times n}$, let P(X$_0$)=$P_{Q,r,c;m,n}$(X$_0$) the probability of $X^{m,n}$=X, under model $X^{m,n} \sim \mathcal{T}$ (Q,r, c; $m$, $n$). Assume there exists a constant c>0 such that Q (x|u, v)≥c. Then, there can exist a constant C, which can depend on c, such that the following can happen;
for $X^{m,n} \sim \mathcal{T}$ (Q,r, c; $m$, $n$) and any t≥0 with probability at least 1−2e$^{-t}$:

$$|-\log P(X^{m,n})| \leq C\sqrt{mn(m+n)t} \quad \text{(Eq. 5.4)}$$

For simplicity, in the last statement, assumptions can be made that are appropriate to the case, in which Q, r, c may be independent of $m$,$n$. A more general statement with stronger, e.g., more complicate, bounds is described herein elsewhere.

5.2 Failure of Classical Compression Schemes

Two types of codes are analyzed herein: finite-state encoders and Lempel-Ziv codes. Both can operate on the serialized data X$^N$=vec(X$^{m,n}$), N=$mn$, which can be obtained by scanning the table in row-first order where column-first can yield symmetric results.

5.2.1 Finite state encoders. A finite state (FS) encoder can take the form of a triple (Σ, f, g) with Σ a finite set of cardinality M=|Σ| and $$f: \mathcal{X} \times \sum \rightarrow \{0, 1\}^*, g: \mathcal{X} \times \sum \rightarrow \sum \quad \text{(Eq. 5.5)}$$

Assume that Σ contains a special 'initialization' symbol s$_{init}$. Starting from state s$_0$=s$_{init}$, the encoder can scan the input X$^N$ sequentially. Assume after the first $\ell$ input symbols, the state is in state $s_\ell$ and produced encoding $z_1^{k(\ell)}$. Given input symbol $X_{\ell+1}$, the encoder appends f($X_{\ell+1}(s_\ell)$ to the codeword and updates its state to $s_{\ell+1}$=g($X_{\ell+1}$, $s_\ell$).

Denote $f_\ell$ ($X^\ell$, s$_{init}$)∈ {0,1} *, the binary sequence obtained by applying the finite state encoder to the vector $X^\ell$ =(X$_1$, . . . , X$_\ell$). The FS encoder can be defined as information lossless if for any $\ell \in \mathbb{N}$, $X^\ell \mapsto f_\ell$ ($X^\ell$, s$_{init}$) is injective.

Theorem 1. Let $X^{m,n} \sim \mathcal{T}$ (Q, r, c; $m$, $n$) and (Σ, f, g) be an information lossless finite state encoder. Define the corresponding compression rate R$_{\Sigma,f,g}$($X^{m,n}$), as per Eq. 3.1. Assuming $m$>10, |Σ|$\mathcal{X}$|, and log$_2$|Σ|≤$n$log$_2$|X |/9, then, $$\mathbb{E}R_{\Sigma,f,g}(X^{m,n}) \geq \frac{H(X \mid U)}{\log_2|\mathcal{X}|} - 10\sqrt{\frac{\log|\Sigma|}{n \log|\mathcal{X}|}} \log(n \log|\Sigma|) \quad \text{(Eq. 5.6)}$$

where the leading term of the above lower bound is H(X|U)/ log$_2$|X|.

Since conditioning can reduce entropy, this is strictly larger than the ideal rate which is roughly H(X|U,V)/ log$_2$|X|, e.g., Eq. 5.3. The next term can be negligible provided log|Σ|<<n log|X|, e.g., modulo logarithmic factors which may be a proof artifact. This condition can be easy to interpret. For example, the finite state machine may not have enough states to memorize a row.

5.2.2 Lempel-Ziv

The pseudocode of the Lempel-Ziv algorithm is shown in FIG. 4. FIG. 4 shows that, after the first k characters of the input have been parsed, the encoder can find the longest string $$X_k^{k+\ell-1},$$

which may appear in the past. The encoder can then encode a pointer to the position of the earlier k appearance of the string T$_k$ and its length L$_k$.

The method can then encode the pointer T$_k$ in plain binary using [log$_2$ (N+|x|)]bite. In some cases, T$_k$ ∈ {−|X|+1, . . . , 1, . . . , N}), and Ly can use an instantaneous prefix-free code, e.g., Elias γ-code, taking 2 [log$_2$L$_k$]+1. This can be sub-optimal, but the space taken by the encoding of L$_k$ can be of lower order with respect to the one of T$_k$ Assumption 1. The following can hold:
1. There exist a constant c$_o$>0 such that:

$$\max_{x \in \mathcal{X}} \max_{u,v \in \mathcal{L}} Q(x|u, v) \leq 1 - c_0 \quad \text{(Eq. 5.7)}$$

2. Consider sequences of instances with Q r, c, X, $\mathcal{L}$ fixed and m, n=→∞ so that:

$$\lim_{n\to\infty} \frac{\log m}{\log n} = \alpha \in (0, \infty) \quad \text{(Eq. 5.8)}$$

equivalently $m = n^{\alpha+o(1)}$

As mentioned herein, consider sequences of instances with $m, n \to \infty$, which can mean the sequence to be indexed by $n$, and let $m = m_n$, which can depend on $n$ such that Eq. 5.8 holds.

Theorem 2. Define the asymptotic Lempel-Ziv rate as:

$$R_{LZ}^\infty := \frac{1}{\log_2|X|} \sum_{u \in \mathcal{L}} r(u) \left[ H(X|U=u) \wedge \left(\frac{1+\alpha}{\alpha}\right) H(X|U=u, |V) \right] \quad \text{(Eq. 5.9)}$$

Then, under Assumption 1, $$\lim_{m,n\to\infty} \mathbb{E} R_{LZ}(X^{m,n}) = R_{LZ}^\infty \quad \text{(Eq. 5.10)}$$

The asymptotics of the Lempel-Ziv rate can be given by the minimum of two expressions, which can correspond to different behaviors of the encoder. For example, for $u \in \mathcal{L}$, define $\alpha(u) := H(X|U=u, V)/(H(X|U=u)-H(X|U=u, V))$ with $\alpha(u) = \infty$ if $H(X|U=u) = H(X|U=u,V)$).

Then, if $\alpha < \alpha_*(u)$, then it may be a 'skinny table' regime. For example, the algorithm may mostly deduplicate segments in rows with latent u by using strings in different rows but aligned in the same columns. If $\alpha < \alpha(u)$, then it may be a 'fat table' regime. For example, the algorithm may mostly deduplicate segments on rows with latent u by using rows and columns that are not the same as the current segment.

Example. Symmetric Binary Model (SBM), dense regime. Under the SBM, $\mathcal{T}_{SBM}(p_0, p_1, k; m, n)$ example, the optimal compression rate of Corollary 5.2, the finite state compression rate of Theorem 1, the Lempel-Ziv rate of Theorem 2 can be computed.

Assume $p_0$, $p_1$ of order one, and $m = n^{\alpha+o_n(1)}$ as $m$, $n \to \infty$. In some cases, the resulting tales can be dense in the sense of containing a constant fraction of non-zeros. Then, $$\mathbb{E} R_{opt}(X^{m,n}) = \left(1 - \frac{1}{k}\right) h(p_0) + \frac{1}{k} h(p_1) + o_n(1) \quad \text{(Eq. 5.11)}$$

$$\mathbb{E} R_{\Sigma,f,g}(X^{m,n}) \geq h(\overline{p}) + o_n(1), \overline{p} := (1 - \tfrac{1}{k})p_0 + \frac{1}{k} p_1 \quad \text{(Eq. 5.12)}$$

$$\mathbb{E} R_{LZ}(X^{m,n}) = h(\overline{p}) \wedge \left(\frac{1+\alpha}{\alpha}\right)\left(\left(1 - \frac{1}{k}\right) h(p_0) + \frac{1}{k} h(p_1)\right) + o_n(1) \quad \text{(Eq. 5.13)}$$

where the right hand sides correspond to the contour lines in FIG. 3A and FIG. 3B and where ANS is a finite-state encoder.

5.3 Practical Latent-Based Compression

Achieving the ideal compression rate of Corollary 5.2 via arithmetic or Huffmann coding may require, a priori, computing the probability P ($X^{m,n}$) of the table $X^{m,n}$. The method herein can achieve a compression rate that is close to the ideal rate via latents estimation. For example, consider general latents estimators $\hat{u}: \mathcal{X}^{m\times n} \to \mathcal{L}^m$, $\hat{v}: \mathcal{X}^{m\times n} \to \mathcal{L}^n$. Accuracy can be measured by the overlaps as:

$$\hat{A}_U(X; \hat{u}) := \frac{1}{m} \min_{\pi \in \mathfrak{S}_\mathcal{L}} \sum_{i=1}^m 1_{\hat{u}_i(X) \neq \pi(u_i)}$$

$$\hat{A}_V(X): \hat{v}) := \frac{1}{n} \min_{\pi \in \mathfrak{S}_\mathcal{L}} \sum_{i=1}^n 1_{\hat{v}_i(X) \neq \pi(v_i)}$$

where the minimization is over the set $\mathfrak{S}_\mathcal{L}$ of permutations of the latents alphabet $\mathcal{L}$.

Any estimators $\hat{u}$, $\hat{v}$ can be used to reorder rows and columns and compress the table $X^{m,n}$ according to the methods described herein. Denote by $R_{lat}(X^{m,n})$, the compression rate achieved by such a procedure. From Eq. 1.3, the following can be obtained:

$$R_{lat}(X^{m,n}) = \frac{1}{mn \log_2|X|} \Big\{ len(\text{header}) + \quad \text{(Eq. 5.14)}$$

$$len(Z_\mathcal{L}(\hat{u})) + len(Z_\mathcal{L}(\hat{v})) + \sum_{u,v \in \mathcal{L}} len\big(Z_X|\hat{X}(u,v)\big)\Big\}$$

where $\hat{X}(u, v)) = \text{vec}(X_{ij}: \hat{u}_i(X) = u, \hat{v}_j(X) = v$ are the estimated blocks of X. This rate can depend on the base compressors $Z_\mathcal{L}$, $Z_X$ but can be omitted these from notations. The first result can imply that, if the latent estimators are consistent, e.g., they recover the true latents with high probability up to permutations, then the resulting rate may be close to the ideal one.

Lemma 5.4. Assume data distributed according to model $X^{m,n} \sim \mathcal{T}$ (Q, r, c; $m$, $n$), with $m$, $n \geq \log_2|\mathcal{L}|$. Further, assume r($u$), c($v$)>$\sqrt{c}$ for all $u$, $v \in \mathcal{L}$. Let $R_{lat}(X^{m,n})$ be the rate achieved by the latent-based scheme with latents estimators $\hat{u}$, $\hat{v}$ and base encoders $Z_X = Z_\mathcal{L} = Z$. Then, $$\mathbb{E} R_{lat}(X^{m,n}) \leq \quad \text{(Eq. 5.15)}$$

$$\frac{H(X^{m,n})}{mn \log_2|X|} + 2\mathbb{P}\big(\hat{A}_U(X^{m,n}; \hat{u}) < 1\big) + 2\mathbb{P}\big(\hat{A}_V(X^{m,n}; \hat{v}) < 1\big) +$$

$$\frac{4 \log(mn)}{mn} + |\mathcal{L}|^2 \Delta_Z\big(c \cdot mn; \{Q(\cdot|u, v)\}_{u,v \in \mathcal{L}} + 2\Delta_Z(m \wedge n; \{r, c\})\big)$$

where $\Delta_z$ (N; $\mathcal{P}$ *) can be the worst case overhead of encoder Z over sources with distributions in $\mathcal{P}$ *.

For example, the overheads of Lempel-Ziv, frequency-based arithmetic coding, and frequency-based ANS coding can be upper bounded respectively as (e.g., where the last bound requires Q,r,c to be independent of N):

$$\Delta_{LZ}(N; \mathcal{P}*) \leq \frac{C(\log|X|^2)}{\log N} \quad \text{(Eq. 5.16)}$$

$$\Delta_{AC}(N; \mathcal{P}*) \leq \frac{2|X|(\log N)}{N} \quad \text{(Eq. 5.17)}$$

$$\Delta_{ANS}(N; \mathcal{P}*) \leq \frac{2|X|(\log N + C_{|X|})}{N} \quad \text{(Eq. 5.18)}$$

The proof of this lemma and the main content of the lemma is in the general bound of Eq. 5.15. More explicitly, $\Delta_z$ (N; $\mathcal{P}$ *) can be defined by:

$$\Delta_Z(N; \mathcal{P}*) := \frac{1}{N \log_2 k} \cdot \max_{p \in \mathcal{P}*}\{\mathbb{E}_p len(Z(Y^N)) - H(Y^N)\} \quad \text{(Eq. 5.19)}$$

where $\mathcal{P}([k]) := \{(p_i)_{i \leq k} \in \mathbb{R}^k : p_i \geq 0 \forall i \Sigma_{i \leq k} p_i = 1\}$ is the set of probability distributions over [k], and $Y^N$ is a vector with entries $Y_i \sim p$. The upper bound (5.16) may be closely related to classical results.

A. Notations, Definition, and Basic Facts

The data take form the form $$X_1^n \in X^n,$$

Where X is a finite alphabet. Consider lossless encoders E: $X^n \to \{0,1\}^*$, and denote by $$k(x_1^n; E) = len(E(x_1^n))$$

the length of the encoded sequence on input $x_1^n$.

For a≤b, it uses $$x_a^b = (x_a, \ldots, x_b)$$

to denote the substring of x. Given a sequence $x_1^n$, it denotes by $$\hat{p}_k(\cdot; x_1^n)$$

the empirical distribution of sequences of length k. Namely, for $w \in cX^k$, let, $$\hat{p}_k(w; x_1^n) := \frac{1}{n-k+1} \sum_{i=1}^{n-k+1} 1_{x_i^{i+k-1} = w}$$

The Shannon entropy of a probability distribution p over a finite or countable set Z is given by, $$H(p) = -\sum_{z \in Z} p(z) \log_2 p(z)$$

Denote by h(ε) the entropy of a Bernoulli random variable Z with $\mathbb{P}(Z=1) = 1 - \mathbb{P}(Z=0) = \varepsilon$ by, $$h(\varepsilon) = -\varepsilon \log_2 \varepsilon - (1-\varepsilon) \log_2(1-\varepsilon)$$

Lemma Let A be a finite set and F: A→{0, 1}* be an injective map. Then, for any probability distribution p over A $$\sum_{a \in A} p(a) \text{len}(F(a)) \geq H(p) - \log_2 \log_2(|A|+2)$$

Proof. Assume without loss of generality that A = {1, ..., M}, with |A|=K, and that the elements of A have all non-vanishing probability and are ordered by decreasing probability $p_1 \geq p_2 \geq \ldots \geq p_k > 0$. Let $N_\ell := 2+4+\ldots+2^\ell = 2^{\ell+1}-2$. Then the expected length is minimized any map F such that len(F(α))=$\ell$ for $N_{\ell-1} \leq a \leq N_\ell$ with the maximum length $\ell_K$ being defined by $N_{\ell_k-1} < K \leq N_{\ell_k}$. For A~$p$, L:=len(F(A)), then:

$$H(p) := H(A) \stackrel{(a)}{\leq} H(L) + H(A|L) \leq \log_2 \ell_k + \sum_{\ell=1}^{\ell_k} \mathbb{P}(L=\ell) H(A|L=\ell) \stackrel{(b)}{\leq}$$

$$\log_2 \ell_k + \sum_{\ell=1}^{\ell_M} \mathbb{P}(L=\ell)\ell \leq \log_2 \log_2(K+2) + \sum_{a \in A} p(a) \text{len}(F(a))$$

where (a) is the chain rule of entropy and (b) follows because by injectivity, given len(F(A))=$\ell$, A can take at most $2^\ell$ values.

B Proofs of results on ideal compression

Proof of Lemma 5.1

Claiming that:

$$\frac{1}{mn} H(X^{m,n}) = H(X|U, V) + \frac{1}{mn} I(X^{m,n}, U^m, V^n) \quad \text{(B.1)}$$

by the definition of mutual information, obtain H($X_{m,n}$)=H($X_{m,n}|U_m, V_n$)+I($X_{m,n}|U_m, V_n$). Equation B.1 follows by noting that:

$$H(X^{m,n}|U^m, V^n) \sum_{u \in \mathcal{L}^m} \sum_{v \in \mathcal{L}^n} \mathbb{P}(U^m = u, V^n = v) H(X^{m,n}|U^m = u, V^n = v) \stackrel{(a)}{=}$$

$$\sum_{i=1}^{m} \sum_{j=1}^{n} \sum_{u \in \mathcal{L}} \sum_{v \in \mathcal{L}^n} \mathbb{P}(U^m = u, V^n = v) H(X_{i,j}|U_i = u, V_j = v) =$$

$$\sum_{i=1}^{m} \sum_{j=1}^{n} \sum_{u \in \mathcal{L}} \sum_{v \in \mathcal{L}} \mathbb{P}(U_i = u_i, V_j = v_j) H(X_{i,j}|U_i = u_i, V_j = v_j) =$$

$$\sum_{i=1}^{m} \sum_{j=1}^{n} H(X_{i,j}|U_i, V_j) \stackrel{(b)}{=} mn H(X_{1,1}|U_1, V_1)$$

where (a) follows from the fact that the ($X_{i,j}$) are conditionally independent given $U^m$, $V^n$, ad since the conditional distribution of $X_{i,j}$ only depends on $U^m$, $V^n$ via $U_i$, $V_j$; (b) holds because the triples ($X_{i,j}$, $U_i$, $V_j$) are identically distributed.

The lower bound in Eq. 5.1 holds because mutual information is non-negative, and the upper bound because I($X^{m,n}$, $U^m$, $V^n$) ≤ H($U^m$, $V^n$) = $mH(U_1) + nH(V_1)$.

Finally, Eq. 5.2 holds because $$I(X^{m,n}; U^m, V^n) = H(U^m, V^n) - H(U^m, V^n | X^{m,n}) \geq$$

$$mH(U_1) + nH(V_1) - \sum_{i=1}^{m} H(U_i | X^{m,n}) - \sum_{j=1}^{n} H(V_j | X^{m,n}) =$$

$$mH(U_1) + nH(V_1) - mH(U_1 | X^{m,n}) - nH(V_1 | X^{m,n})$$

Proof of Lemma 5.3

Lemma B.1. Let $\zeta = (\xi_{ij})_{i \leq m, j \leq n}$, $\sigma = (\sigma_i)_{i \leq m}$, $\tau = (\tau_j)_{j \leq n}$ be collections of mutually independent random variables taking values in a measurable space $Z \times Z^3 \to Z$, $F: Z^{m \times n} \to \mathbb{R}$. Define $x(\zeta, \sigma, \tau) \in \mathbb{R}^{m \times n}$ via $x(\zeta, \sigma, \tau)_{ij} = x(\zeta_{ij}, \sigma_i, \tau_j)$.

Given a vector of independent random variables z, let $\text{Var}_{z_j}(f(z)) := \mathbb{E}_{z_i}[(f(z) - \mathbb{E}_{z_i} f(z))^2]$. Define the quantities:

$$B_* := \max |F(x) - F(x'')| \quad \text{(Eq. B.2)}$$
$$x, x' \in Z^{m \times n}$$
$$d(x, x') \leq 1$$

$$B_1 := \max \max |\mathbb{E}_\xi F(x(\xi, \sigma, \tau)) - \mathbb{E}_\xi F(x(\zeta, \sigma', \tau))| \quad$$
$$\sigma, \sigma' \in Z^m \, \tau \in Z^n \quad \text{(Eq. B.3)}$$
$$d(\sigma, \sigma') \leq 1$$

$$B_2 := \max \max |\mathbb{E}_\xi F(x(\xi, \sigma, \tau)) - \mathbb{E}_\xi F(x(\zeta, \sigma, \tau'))| \quad \text{(Eq. B.4)}$$
$$\sigma \in Z^m \, \tau, \tau' \in Z^n$$
$$d(\tau, \tau') \leq 1$$

$$V_* := \sup_{\xi, \tau, \sigma} \sum_{i \leq m, j \leq n} \text{Var}_{\xi_{ij}}\{F(x(\xi, \sigma, T))\} \quad \text{(Eq. B.5)}$$

$$V_1 := \sup_{\tau, \sigma} \sum_{i \leq m} \text{Var}_{\sigma_i}\{\mathbb{E}_\xi F(x(\xi, \sigma, \tau))\}, \quad \text{(Eq. B.6)}$$

$$V_2 := \sup_{\tau, \sigma} \sum_{j \leq n} \text{Var}_{\sigma_j}\{\mathbb{E}_\xi F(x(\xi, \sigma, \tau))\} \quad \text{(Eq. B.7)}$$

Then, for any $t \geq 0$, the following holds with probability at least $1 - 8e^{-t}$:

$$|F(x(\zeta, \sigma, \tau)) - \mathbb{E} F(x(\zeta, \sigma, \tau))| \leq 2 \max(\sqrt{2V_* t} + \sqrt{2V_1 t} + \sqrt{2V_2 t}; (B_* + B_1 + B_2)t). \quad \text{(Eq. B.8)}$$

Proof. Let $z \in Z^N$ be a vector of independent random variables and $f: Z^N \to \mathbb{R}$. Define the Martingale $X_k := \mathbb{E}[f(z) | \mathcal{F}_k]$ (where $\mathcal{F}_k := \sigma(Z_1, \ldots, Z_k)$). Then it follows:

$$\text{ess sup}|X_k - X_{k-1}| \leq B_0 := \sup_{d(z, z') \leq 1} |f(z) - f(z')|, \quad \text{(Eq. B.9)}$$

$$\sum_{k=1}^N \mathbb{E}[(X_k - X_{k-1})^2 | \mathcal{F}_{k-1}] = \quad \text{(Eq. B.10)}$$
$$\sum_{k=1}^N \mathbb{E}[(E[f | z_{<k}, z_k] - \mathbb{E}_{z'_k} \mathbb{E}[f | z_{<k}, z'_k])^2 | z_{<k}]$$
$$\leq V_0 := \sup_{z \in Z^N} \sum_{k=1}^N \text{Var}_{z_k}(f(z)) \quad \text{(Eq. B.11)}$$

By Freedman's inequality, with probability at least $1 - 2e^{-t}$, it follows:

$$|f(z) - \mathbb{E} f(z)| \leq \max\left(\sqrt{2V_0 t} ; \frac{2B_0 t}{3}\right) \quad \text{(Eq. B.12)}$$

Define $E(\sigma, \tau) := \mathbb{E}_\xi F(x(\zeta, \sigma, \tau))$, $L(\tau) := \mathbb{E}_{\sigma, \xi x i}(x(\zeta, \sigma, \tau))$. Applying the above inequality, each of the following holds with probability at least $1 - 2e^{-t}$:

$$|F(x(\xi, \sigma, \tau)) - E(\sigma, \tau)| \leq \max\left(\sqrt{2V_* t} ; \frac{2B_* t}{3}\right) \quad \text{(Eq. B.13)}$$

-continued $$|E(\sigma, \tau) - L(\tau)| \leq \max\left(\sqrt{2V_1 t} ; \frac{2B_1 t}{3}\right) \quad \text{(Eq. B.14)}$$

$$|L(\tau) - \mathbb{E} F(x)| \leq \max\left(\sqrt{2V_2 t} ; \frac{2B_2 t}{3}\right) \quad \text{(Eq. B.15)}$$

and the claim follows by union bound.

Following proves a more stronger version of Lemma 5.3.

Lemma B.2. For $X \in X^{m \times n}$, let $P(X) = P_{Q, r, c; m, n}(X)$ the probability applied by the model $\mathcal{T}(Q, r, c; m, n)$ to matrix X, i.e., $$P(X) = \sum_{u \in \mathcal{L}^m} \sum_{v \in \mathcal{L}^n} \pi_{(i,j) \in [m] \times [n]} Q(X_{ij} u_i, v_i)$$
$$\prod_{i \in [m]} r(u_i) \pi_{j \in [n]c}(v_j) \quad \text{(Eq. B.16)}$$

Define the following quantities:

$$M_* := \max_{x, x' \in X u, v \in \mathcal{L}} \left|\log \frac{Q(x | u, v)}{Q(x' | u, v)}\right| \quad \text{(Eq. B.17)}$$

$$M_1 := \max_{\tau, \sigma, \sigma'} \|Q(\cdot | \sigma, \tau) - Q(\cdot | \sigma', \tau)\|_{TV} \max_{u, v, x, x''} \left|\log \frac{Q(x | u, v)}{Q(x' | u, v)}\right| \quad \text{(Eq. B.18)}$$

$$M_2 := \max_{\tau, \tau', \sigma} \|Q(\cdot | \sigma, \tau) - Q(\cdot | \sigma, \tau')\|_{TV} \max_{u, v, x, x''} \left|\log \frac{Q(x | u, v)}{Q(x' | u, v)}\right| \quad \text{(Eq. B.19)}$$

(Eq. B.20)

$$s_* := \frac{1}{2} \max_{u_0, v_0 \in \mathcal{L}} \sum_{x, x' \in X} Q(x | u_0 v_0) Q(x' | u_0 v_0) \max_{u, v \in \mathcal{L}}\left(\log \frac{Q(x | u, v)}{Q(x' | u, v)}\right)^2$$

(Eq. B.21)

$$s_1 := \frac{1}{2} \max_{u_0, u'_0 v_0 \in \mathcal{L}} \|Q(\cdot | u_0, v_0) - Q(\cdot | u_0, v_0)\|_{TV} \max_{x, x' \in \mathcal{L} u, v \in \mathcal{L}} \max\left(\log \frac{Q(x | u, v)}{Q(x | u, v)}\right)^2$$

(Eq. B.22)

$$s_2 := \frac{1}{2} \max_{u_0, v_0, v'_0 \in \mathcal{L}} \|Q(\cdot | u_0, v_0) - Q(\cdot | u_0, v'_0)\|_{TV} \max_{x, x' \in \mathcal{L} u, v \in \mathcal{L}} \max\left(\log \frac{Q(x | u, v)}{Q(x | u, v)}\right)^2$$

Then, for $X \sim \mathcal{T}(Q, r, c; m, n)$ and any $t \geq 0$ the following bound holds with probability at least $-2e^{-t}$:

$$|-\log P(X) - H(X)| \leq \quad \text{(Eq. B.23)}$$
$$3 \max\left(\sqrt{s_* mnt} + \sqrt{s_1 mn^2 t} + \sqrt{s_2 m^2 nt}, M_* + M_1 n + M_2 m\right)$$

Proof. Let $$\sigma = (\sigma_i)_{i \leq m} \sim_{iid} r, \tau = (\tau_i)_{i \leq n} \sim_{iid} c,$$

$$\xi = (\zeta_{ij})_{i \leq m, j \leq n} \sim_{iid} \text{Unif}([0, 1]), \text{ and } x:[0, 1] \times \mathcal{L} \times \mathcal{L} \to X$$

be such that $x(\zeta_{ij}, \sigma_i, \tau_i) | \sigma_i, \tau_i \sim Q(\cdot | \sigma_i; \tau_i)$. It defines $F(x) = -\log P(x)$, and will apply Lemma B.1 to this function. Using the notation from that lemma, it claims that $B_* \leq M_*$, $B_1 \leq M_1 n$, $B_2 \leq M_2 m$, and $V \leq mn$, $V_1 \leq mn^2 s_1$, $V_2 \leq m^2 n s_2$. Note that, if $(x_{ij})$, $(x'_{ij})$ differ only for entry $i, j$, then:

$$F(x) - F(x') = -\log E_{u,v|x}\left\{\frac{Q(x'_{ij} | u_i, v_j)}{Q(x_{ij} | u_i, v_j)}\right\} \quad \text{(Eq. B.24)}$$

where $E_{u,v|x}$ denotes expectation with respect to the posterior measure $P(u, v | X = x)$. This immediately implies $B \leq M$.

Next consider the constant $B_1$ defined in Eq. (B.3). Using the exchangeability of the $(\zeta_i, \sigma_i)$, it gets:

$$B_1 = \max_\tau \left| \mathbb{E}_\xi \log \mathbb{E}_{u,v|x} \left\{ \prod_{j=1}^n \frac{Q(x(\xi_{1,j}, \sigma'_1, \tau_j) | u_1, v_j)}{Q(x(\xi_{1,j}, \sigma_1, \tau_j) | u_1, v_j)} \right\} \right| \le$$

$$\max_\tau \mathbb{E}_\xi \max_{u,v} \left| \log \left\{ \prod_{j=1}^n \frac{Q(x(\xi_{1,j}, \sigma'_1, \tau_j) | u_1, v_j)}{Q(x(\xi_{1,j}, \sigma_1, \tau_j) | u_1, v_j)} \right\} \right| \le$$

$$\max_\tau \sum_{j=1}^n \mathbb{E}_\xi \max_{u,v} \left| \log \left\{ \frac{Q(x(\xi_{1,j}, \sigma'_1, \tau_j) | u_1, v_j)}{Q(x(\xi_{1,j}, \sigma_1, \tau_j) | u_1, v_j)} \right\} \right| \le$$

$$n \max_{\tau, \sigma\sigma'} \mathbb{E}_\xi \max_{u,v} \left| \log \frac{Q(x(\xi_1, \sigma'_1, \tau_j) | u_1, v_j)}{Q(x(\xi_1, \sigma_1, \tau_j) | u_1, v_j)} \right| \le$$

$$n \max_{\tau, \sigma\sigma'} \|Q(\cdot | \sigma, \tau) - Q(\cdot | \sigma', \tau)\|_{TV} \max_{u,v,x,x'} \left| \log \frac{Q(x | u, v)}{Q(x' | u, v)} \right| = M_1$$

where the bound $B_2 \le M_2 m$ is proved analogously.

Consider now the quantity $V_a$ of Eq. (B.5). Denote by $\zeta_{(ij)}(t)$ the array obtained by replacing entry $(i, j)$ in $\{$ by t, and by $x(t) = x(\zeta_{(ij)}(t), \sigma, \tau)$. Then it follows:

$$\text{Var}_{\xi_{ij}}(F(x)) = \frac{1}{2} \mathbb{E}_{\xi', \xi''} \left\{ (F(x(\xi_{(ij)}(\xi'), \sigma, \tau)) - F(x(\xi_{(ij)}(\xi''), \sigma, \tau)))^2 \right\} =$$

$$\frac{1}{2} \mathbb{E}_{\xi', \xi''} \left\{ \left( \log E_{u,v|x(\xi')} \left\{ \frac{Q(x(\xi'', \sigma_i, \tau_j) | u_i, v_j)}{Q(x(\xi', \sigma_i, \tau_j) | u_i, v_j)} \right\} \right)^2 \right\} \le$$

$$\frac{1}{2} \mathbb{E}_{\xi', \xi''} \max_{u,v} \left( \log \left\{ \frac{Q(x(\xi'', \sigma_i, \tau_j) | u_i, v_j)}{Q(x(\xi', \sigma_i, \tau_j) | u_i, v_j)} \right\} \right)^2 =$$

$$\frac{1}{2} \sum_{x,x'} Q(x | \sigma, \tau) Q(x' | \sigma, \tau) \max_{u,v} \left( \log \left\{ \frac{Q(x | u, v)}{Q(x' | u, v)} \right\} \right)^2$$

Next, as claimed:

$$V_* \le \max_{\xi, \sigma, \tau} \sum_{i \le m, j \le n} \text{Var}_{\xi_{ij}} \{F(x)\} \le mn \max_{\xi, \sigma, \tau} \text{Var}_{\xi_{ij}} \{F(x)\} \le mn s_*$$

Finally, consider the quantity $V_1$ of Eq. (B.6) (the argument is similar for $V_2$). Denote by $\sigma_{(i)}(t)$ the vector obtained by replacing entry i in $\sigma$ by t. Proceeding as above, it follows:

$$\text{Var}_{\sigma_i}(\mathbb{E}_\xi F(x)) = \frac{1}{2} \mathbb{E}_{\sigma', \sigma''} \left\{ (\mathbb{E}_\xi F(x(\xi, \sigma_{(i)}(\sigma'), \tau)) - \mathbb{E}_\xi F(x(\xi, \sigma_{(i)}, \tau)))^2 \right\} =$$

$$\frac{1}{2} \mathbb{E}_{\sigma', \sigma''} \left\{ \left( \mathbb{E}_\xi \log E_{u,v|x(\sigma')} \left\{ \prod_{j=1}^n \frac{Q(x(\xi_{ij}, \sigma'', \tau_j) | u_i, v_j)}{Q(x(\xi_{ij}, \sigma', \tau_j) | u_i, v_j)} \right\} \right)^2 \right\} \le$$

$$\frac{1}{2} \mathbb{E}_{\sigma', \sigma''} \left\{ \left( \mathbb{E}_\xi \log \left\{ \prod_{j=1}^n \max_{u,v} \frac{Q(x(\xi_{ij}, \sigma'', \tau_j) | u_i, v_j)}{Q(x(\xi_{ij}, \sigma', \tau_j) | u_i, v_j)} \right\} \right)^2 \right\} \le$$

$$\frac{1}{2} \mathbb{E}_{\sigma', \sigma''} \left\{ \left( \sum_{j=1}^n \mathbb{E}_\xi \log \max_{u,v} \frac{Q(x(\xi, \sigma'', \tau_j) | u, v)}{Q(x(\xi, \sigma', \tau_j) | u, v)} \right)^2 \right\} \le$$

$$\frac{n^2}{2} \max_\tau \mathbb{E}_{\sigma', \sigma''} \left\{ \left( \mathbb{E}_\xi \log \max_{u,v} \frac{Q(x(\xi, \sigma'', \tau_j) | u, v)}{Q(x(\xi, \sigma', \tau_j) | u, v)} \right)^2 \right\} \le$$

$$\frac{n^2}{2} \max_{\tau, \sigma\sigma'} \|Q(\cdot | \sigma, \tau) - Q(\cdot | \sigma', \tau)\|_{TV} \max_{x, x^1} \left( \mathbb{E}_\xi \log \left\{ \max_{u,v} \frac{Q(x' | u, v)}{Q(x | u, v)} \right\} \right)^2 = n^2 s_1$$

Therefore, $$V_1 = \max_{\sigma, \tau} \sum_{i=1}^m \text{Var}_{\sigma_i}(\mathbb{E}_\xi F(x)) \le mn^2 s_1$$

C Proofs for Finite State Encoders

It shows above that a finite-state encoder is defined by a triple $(\Sigma, f, g)$. Formally, it can define the action of f, g on $$x_1^n \in \mathcal{X}^n$$

recursively via $$f_{m+1}(x_1^{m+1}, s_0) = f_m(x_1^m, s_0) \oplus f(x_{m+1}, g(x_1^m, s_0)) \quad \text{(Eq. C.1)}$$

$$g_{m+1}(x_1^{m+1}, s_0) = g_m(x_{m+1}, g(x_1^m, s_0)) \quad \text{(Eq. C.2)}$$

and the encoder is thus given by $$E(x_1^n) = f_n(x_1^n, s_{init}).$$

The state space $\Sigma$ is non-degenerate if, for each $s_1 \in \Sigma$ there exists $$m, x_1^m \in \mathcal{X}^m$$

such that $$g_m(x_1^m, s_{init}) = s_1.$$

Notice, that if state space is degenerate, it can remove one or more symbols from without changing the encoder and making the state-space non-degenerate. The method may assume non-degeneracy without mentioning it.

The FS encoder is information lossless (IL) if for any $$n \in \mathbb{N}, x_1^n \mapsto f_n(x_1^n, s_{init})$$

is injective.

Remark C.1. An information-lossless encoder satisfies a stronger condition: for any $m \in \mathbb{N}$ and any $s_* \in \Sigma$, the map $$x_1^m \mapsto f_m(x_1^m, s_*)$$

is injective

Assume this were not the case, then there may exist two distinct inputs $$x_1^m, \tilde{x}_1^m \in \mathcal{X}^m$$

and a state $s_* \in \Sigma$ such that $$f_m(x_1^m, s_*) = f_m(\tilde{x}_1^m, s_*).$$

By non-degeneracy, there exists $$a_1^\ell \in \mathcal{X}^\ell$$

such that $$s_* = g_\ell(a_1^\ell, s_{init}),$$

Defining $$n = \ell + m, \quad y_1^n = a_1^\ell \oplus x_1^m, \quad \tilde{y}_1^n = a_1^\ell \oplus \tilde{x}_1^m,$$

is not easy to check that these inputs are distinct but $$f_n(y_1^n, s_{init}) = f_n(\tilde{x}_1^n, s_{init}).$$

Proposition C.1. Define the compression rate on input $$x_1^n \text{ as } R(x_1^n) = len(f_n(x_1^n, S_{init}))/(n\log_2|\mathcal{X}|).$$

Then for any $\ell \geq 1$, the following holds (where $n':=n-2\ell$ and recall that $M:=|\Sigma|$):

$$R(x_1^n) \geq \frac{n-2\ell}{n\ell\log_2|\mathcal{X}|} H\left(\frac{\hat{p}^\ell}{x_1^{n'}}\right) - \frac{1}{\ell\log_2|\mathcal{X}|}\left(\log_2(|\Sigma|^\ell) + \log_2\log_2|\mathcal{X}|\right) \quad \text{(Eq. C.3)}$$

Proof. The method denotes by $L(x_1^m; s_*)$ the length of the encoding of $x_1^m$ when starting in state $s_*$:

$$L(x_1^n; s_*) := len(f_n(x_1^n, s_*)) \quad \text{(Eq. C.4)}$$

It then follows, for any $b \in \{0, \ldots, \ell-1\}$, and setting by convention $s_0 = S_{init}$, it may get:

$$R(x_1^n) \geq \frac{1}{n\log_2|\mathcal{X}|} \sum_{k=0}^{\lfloor n/\ell \rfloor - 2} L\left(x_{k\ell+b+1}^{(k+1)\ell+b}; s_{k\ell+b}\right) \quad \text{(Eq. C.5)}$$

By averaging over b, and introducing the shorthand $n' := n - 2\ell$, it gets:

$$R(x_1^n) \geq \frac{1}{n\ell\log_2|\mathcal{X}|} \sum_{m=1}^{(\lfloor n/\ell \rfloor - 1)\ell} L\left(x_m^{m+\ell-1}; s_{m-1}\right) \quad \text{(Eq. C.6)}$$

$$\geq \frac{n-2\ell}{n\ell\log_2|\mathcal{X}|} \sum_{s\in\Sigma}\sum_{u_1^\ell\in\mathcal{X}^\ell}\left\{\hat{p}^\ell_{x_1^{n'}}(u_1^\ell, s) L(u_1^\ell; s)\right\} \quad \text{(Eq. C.7)}$$

$$(a) \geq \frac{n-2\ell}{n\ell\log_2|\mathcal{X}|} \sum_{s\in\Sigma}\left\{\hat{p}^\ell_{x_1^{n'}}(s) H\left(\hat{p}^\ell_{x_1^{n'}}(\cdot|s)\right) - \log_2\log_2(|\mathcal{X}|^\ell)\right\} \quad \text{(Eq. C.8)}$$

where (a) holds by Lemma A.1. By the chain rule of entropy (recalling that $M:=|\Sigma|$), it follows:

$$\sum_{s\in\Sigma} \hat{p}^\ell_{x_1^{n'}}(s) H\left(\hat{p}^\ell_{x_1^{n'}}(\cdot|s)\right) = H(X_1^\ell|S) = \quad \text{(Eq. C.3)}$$

$$H(X_1^\ell) + H(S|X_1^\ell) - H(S) \geq H(X_1^\ell) - \log_2 M = H\left(\hat{p}^\ell_{x_1^{n'}}\right) - \log_2 M$$

where the claim (C.3) follows by using the last inequality in Eq. C.8.

Theorem 3. Let $\mathbf{X}^{m,n} \sim \mathcal{T}(Q, r, c, m, n)$ and $(\Sigma, f, g)$ be an information lossless finite state encoder. With an abuse of notation, denote $f_{mn}(X^{m\times n}, S_{init}) \in \{0,1\}^*$ the binary sequence obtained by applying the finite state encoder to the vector $vec(X^{m\times n}) \in \mathcal{X}^{mn}$ obtained by scanning $X^{m\times n}$ in row-first order. Define the compression rate by:

$$R(X^{m,n}) := \frac{len(f_{mn}(X^{m\times n}, s_{init}))}{mn \log_2|\mathcal{X}|} \quad \text{(Eq. C.9)}$$

Assuming $n>10$, $|\Sigma|\geq|\mathcal{X}|$, and $\log_2|\Sigma|<n\log_2|\mathcal{X}|/9$, the expected compression rate is lower bounded as follows:

$$\mathbb{E}R(X^{m,n}) \geq \left(\frac{H(X|U)}{\log_2|\mathcal{X}|}\right) - 10\sqrt{\frac{\log|\mathcal{X}|}{n\log|\mathcal{X}|}} \cdot \log(n \log|\Sigma|) \quad \text{(Eq. C.10)}$$

Proof. Let $N := mn$, $N' := mn - 2\ell$ where $\ell \leq n/3$ will be selected later. Let $X^N := vec(X^{m,n})$ for the vectorization $X^{m,n}$, $X^{N'}$, for the vector comprising its first N' entries. Recall the definition of empirical distribution. For any fixed $w \in \mathcal{X}^\ell$:

$$\hat{p}^\ell_{X^{N'}}(w) := \frac{1}{N'-\ell+1} \sum_{i=1}^{N'-\ell+1} 1_{X_i^{i+\ell-1}=w}$$

Let $S := \{i \in [N'-\ell+1] : [i, i+\ell-2] \cap n\mathbb{N} = \emptyset\}$. These are the subset of blocks of length $\ell$ that do not cross the end of a line in the table. Since for each line break there are at most $\ell-1$ such blocks, it follows $|S| \geq N' - \ell + 1 - (m-1)(\ell-1)$. Consider the following modified empirical distribution:

$$\bar{p}^\ell_{X^{N'}}(w) := \frac{1}{|S|} \sum_{i\in S} 1_{X_i^{i+\ell-1}=w}$$

Then, by construction:

$$\hat{p}^{\ell}_{X^{N'}}(w) := (1-\eta_\ell)\bar{p}^{\ell}_{X^{N'}}(w) + \eta_\ell q^{\ell}_{X^{N'}}(w)$$

$$\eta_\ell := 1 - \frac{|S|}{N'-\ell+1} = \frac{(m-1)(\ell-1)}{N'-\ell+1}$$

where $q^{\ell}_{X^N}$ is the empirical distribution of blocks that do cross the line. By concavity of the entropy, it follows:

$$H(\hat{p}^{\ell}_{X^{N'}}) \geq (1-\eta_\ell)H(\bar{p}^{\ell}_{X^{N'}}) + \eta_\ell H(q^{\ell}_{X^{N'}}) \geq (1-\eta_\ell)H(\bar{p}^{\ell}_{X^{N'}}) \quad \text{(Eq. C.11)}$$

Further, since $\ell \geq n/3$:

$$\eta_\ell = \frac{(m-1)(\ell-1)}{(mn-3\ell+1)} \leq \frac{(m-1)(\ell-1)}{(mn-3\ell+1)} \leq \frac{(m-1)\ell}{(m-1)n} \leq \frac{\ell}{n} \quad \text{(Eq. C.12)}$$

Now, let the row latents $u := (u_i)_{i \leq m}$ be fixed, and denote by $\hat{r}^S_u$ their weighted empirical distribution, defined as follows:

$$\hat{r}^S_u(s) := \sum_{i=1}^{m} \frac{|S \cap [(i-1)n+1, in]|}{|S|} 1_{u_i=s}$$

where $\hat{r}^S_u$ is the empirical distribution of the latents $(u_i)_{i \geq m}$ where row i is weighted by its contribution to S. Note that all the weights are equal to $(n-2(\ell-1))/|S|$ except, potentially, for the last one.

It follows:

$$p^{\ell}_*(\omega) := \mathbb{E}\left[\bar{p}^{\ell}_{X^{N'}}(\omega)\right] = \sum_{u \in \mathcal{L}} \hat{r}^S_u(u) \prod_{i=1}^{\ell} Q_{x|u}(\omega_i | u),$$

$$Q_{x|u}(\omega | u) := \sum_{u \in \mathcal{L}} Q(\omega | u, v)c(v)$$

Using Eq. (C.11), (C.12), and concavity of the entropy, it gets:

$$\mathbb{E}\left[H(\hat{p}^{\ell}_{X^{N'}}) | u\right] \geq \left(1 - \frac{\ell}{n}\right) H(p^{\ell}_*) \quad \text{(Eq. C.13)}$$

By Proposition C.1, it gets:

$$\mathbb{E}[R(X^{m,n}) | u] \geq$$

$$\frac{mn - 2\ell}{mn\ell \log_2|X|}\left(1 - \frac{\ell}{n}\right)H(p^{\ell}_*) - \frac{1}{\ell\log_2|X|}(\log_2(|\textstyle\sum|\ell) + \log_2\log_2|X|) \geq$$

$$\frac{1}{\ell\log_2|X|}H(p^{\ell}_*) - \frac{2\ell}{n} - \frac{1}{\ell\log_2|X|}(\log_2(|\textstyle\sum|\ell) + \log_2\log_2|X|)$$

where in the last inequality it used the fact that $H(p^{\ell}_*) \leq \ell\log_2|X|$. It is chosen:

$$\ell = \sqrt{\frac{n\log_2|X|}{\log_2|X|}} \leq \frac{n}{3} \quad \text{(Eq. C.14)}$$

Substituting and simplifying, it gets:

(Eq. C. 15)

$$\mathbb{E}[R(X^{m,n}) | u] \geq$$

$$\frac{H(p^{\ell}_*)}{\ell\log_2|X|} - \frac{10}{\ell\log_2|X|} \cdot \sqrt{\frac{\log|\textstyle\sum|}{\log|X|}} \cdot \log(n\log|\textstyle\sum|)$$

Finally, letting $(W_1, \ldots, W_\ell, U) \in X^\ell \times \mathcal{L}$ be random variables with joint distribution $$\hat{r}^S_u(u)\prod_{i=1}^{\ell} Q_{x|u}(\omega_i | u).$$

Then, $$H(p^{\ell}_*) \geq \sum_{u \in \mathcal{L}} \hat{r}^S_u(u) H(Q^{\otimes \ell}_{x|u}(\cdot | u)) \quad \text{(Eq. C.16)}$$

$$\geq \ell \sum_{u \in \mathcal{L}} \hat{r}^S_u(u) H(X | U = u) \quad \text{(Eq. C.17)}$$

and therefore $$\mathbb{E}H(p^{\ell}_*) \geq H(X | U),$$

finishing the proof.

D Proofs for Lempel-Ziv coding

It is useful to define for each $k \leq N$, $$L_k(X^N) := \max\{\ell \geq 1 : \exists j \in \{1, \ldots, k-1\} \text{ s.t. } X_j^{j+\ell-1} = X_k^{k+\ell-1}\} \quad \text{(Eq. D.1)}$$

$$T_k(X^N) := \max\{j \in \{1, \ldots, k-1\} \text{ s.t. } X_j^{j+L_K-1} = X_k^{k+L_k-1}\} \quad \text{(Eq. D.2)}$$

Proof of Theorem 2

Lemma D.1. Under Assumption 1, there exists a constant C such that the following holds with probability at least $1 - N^{-10}$:

$$\max_{k \leq N} L_k(X^N) \leq C \log N \quad \text{(Eq. D.3)}$$

Proof. Consider a slightly different setting, and it then shows that the question reduces to this setting. Let $(Z_i)_{i \geq 1}$ be independent random variables with $Z_i \sim q_i$ a probability distribution over $X$. Further assume $\max_{x \in X} q_i(x) \leq 1-c$ for all $i \geq 1$. Then it claims that, for any t, $\ell \geq 1$, it follows:

$$\mathbb{P}(Z_1^t = Z_{t+1}^{t+\ell}) \leq (1-c)^\ell \quad \text{(Eq. D.4)}$$

Condition on the event $$Z_1^t = x_1^t$$

for some $x_1, \ldots, x_t \in \mathcal{X}$, then the event $$Z_1^\ell = Z_{t+1}^{t+\ell}$$

implies that, for $i \in \{t+1, \ldots, t+\ell\}$, $Z_i = x_P(i)$ where $It(i) = i \mod t$, $n(i) \in [1, t]$. Then, $$\mathbb{P}(Z_1^\ell = Z_{t+1}^{t+\ell}) \leq \max_{x_1^t \in \mathcal{X}^t} \mathbb{P}(Z_1^\ell = Z_{t+1}^{t+\ell} \mid Z_1^t = x_1^t) \leq$$

$$\max_{x_1^t \in \mathcal{X}^t} \mathbb{P}(Z_i = x_{\pi(i)} \forall i \in \{t+1, \ldots, t+\ell\} \mid Z_1^t = x_1^t) \leq$$

$$\max_{x_1^t \in \mathcal{X}^t} \prod_{i=t+1}^{t+\ell} \mathbb{P}(Z_i = x_{\pi(i)}) \leq (1-c)^\ell$$

proving claim (D.4).

Reconsider the original setting:

$$\mathbb{P}\left(\max_{k \leq N} L_k(X^N) \geq \ell\right) =$$

$$\mathbb{P}(\exists i < j \leq N : X_i^{i+\ell-1} = X_j^{j+\ell-1}) \leq N^2 \max_{i < j \leq N} \mathbb{P}(X_i^{i+\ell-1} = X_j^{j+\ell-1}) \leq$$

$$N^2 \max_{u^m \in \mathcal{L}^m, v^n \in \mathcal{L}^n} \max_{i < j \leq N} \mathbb{P}(X_i^{i+\ell-1} = X_j^{j+\ell-1} \mid u^m, v^n) \leq N^2(1-c)^\ell$$

where the last inequality follows from claim (D.4), since the $(X_i)_{i \geq N}$ are conditionally independent given the latents $u^m$, $v^n$, with probability mass function upper bounded by $1-c$. The thesis follows by taking $\ell = 12 \log N / \log(1/(1-c))$.

For $i \in [m]$, $j \in [n]$, it defines $\langle ij \rangle := (i-1)n+j$. In words, $k = \langle ij \rangle$ is the of entry at row $i$ column $j$ when the table $X^{m,n}$ is scanned in row first order. For $\ell \geq 1$, define the events:

$$\mathcal{E}_{i,j}(\ell) := \left\{ \exists i' \in [m], j' \in [n] : \langle i' j' \rangle < \langle ij \rangle, \right.$$

$$\left. |j' - j| \geq \ell, X_{\langle i' j' \rangle}^{\langle i' j' \rangle + \ell - 1} = X_{\langle i' j' \rangle}^{\langle i' j' \rangle + \ell - 1} \right\} \quad \text{(Eq. D.5)}$$

$$\mathcal{F}_{i,j}(\ell) := \left\{ \exists i' \in [m], \right. \quad \text{(Eq. D.6)}$$

$$\left. j' \in [n] : \langle i' j' \rangle < \langle ij \rangle, |j' - j| \geq \ell, X_{\langle i' j' \rangle}^{\langle i' j' \rangle + \ell - 1} = X_{\langle ij \rangle}^{\langle ij \rangle + \ell - 1} \right\}$$

Then, it follows:

$$\mathbb{P}(L_{\langle ij \rangle}(X^N) \geq \ell) \leq \mathbb{P}(\mathcal{E}_{i,j}(\ell)) + \mathbb{P}(\mathcal{F}_{i,j}(\ell)) \quad \text{(Eq. D.7)}$$

The next two lemmas control the probabilities of these events.

Lemma D.2. Let $\ell(\delta, u) := [(1+\delta)(\log N)/H(X|U=u)]$, $n' = n - \max_{u \in \mathcal{L}} \ell(\delta, u)$, and $m_0 = m^{1-on(1)}$. Under Assumption 1, for any $\delta > 0$, there exist constants $C$, $\varepsilon > 0$ independent of $u \in \mathcal{L}^m$, such that the following hold:

$$\max_{i \leq m, j \leq n'} \mathbb{P}(\mathcal{E}_{i,j}(\ell(\delta, u_i))) \leq CN^{-\varepsilon} \quad \text{(Eq. D.8)}$$

$$\min_{m_0 \leq i \leq m, j \leq n'} \mathbb{P}(\mathcal{E}_{i,j}(\ell(-\delta, u_i))) \geq 1 - CN^{-\varepsilon} \quad \text{(Eq. D.9)}$$

Lemma D.3. Let $\ell_c(\delta, u) = [(1+\delta)(\log m)/H(X|U=u, V)]$, $n' = n - \max_{u \in \mathcal{L}} \ell_c(\delta, u)$, and $m_0 = m^{1-on(1)}$. Under Assumption 1, for any $\delta > 0$, there exist constants $C$, $\varepsilon > 0$ independent of $u \in \mathcal{L}^m$, such that the following hold:

$$\max_{i \leq m, j \leq n'_c} \mathbb{P}(\mathcal{F}_{i,j}(\ell_c(-\delta, u_i))) \leq Cm^{-\varepsilon} \quad \text{(Eq. D.10)}$$

$$\min_{m_0 \leq i \leq m, j \leq n'_c} \mathbb{P}(\mathcal{F}_{i,j}(\ell_c(-\delta, u_i))) \leq 1 - Cm^{-\varepsilon} \quad \text{(Eq. D.11)}$$

and is ready to prove Theorem 2.

Proof of Theorem 2. It denotes by $(k(1), \ldots, k(M))$ the values taken by $k$ in the while loop of the Lempel-Ziv pseudocode. In particular, $$k(1) = 1 \quad \text{(Eq. D.12)}$$

$$k(\ell + 1) = K(\ell) + L_{k(\ell)}(X^N) \quad \text{(Eq. D.13)}$$

$$k(M) = N \quad \text{(Eq. D.14)}$$

Therefore, the total length of the code is:

$$len(LZ(X^{m,n})) = M\lceil \log_2(N + |\mathcal{X}|) \rceil + \sum_{\ell=1}^{M} len(elias(L_{k(\ell)})) \quad \text{(Eq. D.15)}$$

By Lemma D.1 (and recalling that $len(elias(L)) \leq 2 \log_2 L + 1$), it has, with high probability, $max_{\ell \leq m} len(elias(L_{k(\ell)})) \leq 2 \log_2(C \log N)$. Letting $G$ denote the 'good' event that this bound holds, it has on $G$:

$$M \log_2 N \leq len(LZ(X^{m,n})) \leq \quad \text{(Eq. D.16)}$$

$$M\lceil \log_2(N + |\mathcal{X}|) \rceil + 2M \log_2(C \log N)$$

Since $|\mathcal{X}|$ is a constant, this means that for any $\eta > 0$, there exists $N_0(\eta)$ such that, for all $N \geq N_0(\eta)$, with probability at least $1-\eta$:

$$M \cdot 1_G \log_2 N \leq len(LZ(X^{m,n})) \leq \quad \text{(Eq. D.17)}$$

$$(1 + \eta)M \cdot 1_G \log_2 N + N \cdot 1_{G^c} \log_2 |\mathcal{X}|$$

where on the right $len(LZ\mathbf{X}^{m,n})) \leq N \log_2 |\mathcal{X}|$ by construction. It follows:

$$\mathbb{E}\{M \cdot 1_G\} \frac{\log_2 N}{N \log_2 |\mathcal{X}|} \leq \quad \text{(Eq. D.18)}$$

$$\mathbb{E}R_{LZ}(X^{m,n}) \leq (1 + \eta)\mathbb{E}\{M \cdot 1_G\} \frac{\log_2 N}{N \log_2 |\mathcal{X}|} + \eta$$

that is, $$\lim_{m,n\to\infty} \inf \mathbb{E}R_{LZ}(X^{m,n}) \geq \lim_{m,n\to\infty} \inf \mathbb{E}\{M \cdot 1_G\} \cdot \frac{\log_2 N}{N\log_2|X|} \quad \text{(Eq. D.19)}$$

$$\lim_{m,n\to\infty} \sup \mathbb{E}R_{LZ}(X^{m,n}) \geq \lim_{m,n\to\infty} \sup \mathbb{E}\{M \cdot 1_G\} \cdot \frac{\log_2 N}{N\log_2|X|} \quad \text{(Eq. D.20)}$$

It is left with the task of bounding $\mathbb{E}\{M \cdot 1_G\}$.

Begin by the lower bound. Define the set of 'bad indices' $B(X^{m,n}, \delta) \subseteq [m] \times [n]$, $$B(X^{m,n}, \delta) := \{(i,j) \in [m] \times [n] : \mathcal{E}_{i,j}(\ell(\delta, u_i)) \text{ or } \mathcal{F}_{i,j}(\ell(\delta, u_i))\} \quad \text{(Eq. D.21)}$$

The method drops the arguments $X^{m,n}$, $\delta$ for economy of notation and writes $B := B(X^{m,n}, \delta)$. It further defines:

$$S(u) = \quad \text{(Eq. D.22)}$$

$$S(u; X^{m,n}) := \{(i,j) \in [m] \times [n] : u_i = u \text{ and } \exists \ell \leq M : \langle ij \rangle = k(\ell)\}$$

where $S(u)$ is the set of positions $(i, j)$ of the table $X^{m,n}$ where words in the LZ parsing begin.

It also writes $N(u) = n \cdot |\{i \in [m] : u_i = u\}|$ for the total number of rows in $X^{m,n}$ with row latent equal to $u_i$ and $L_i^-$ for the length of the first segment in row i initiated in row i−1:

$$N(u) \leq \sum_{(i,j)\in S(u)} L_{\langle ij \rangle} + \sum_{i \leq m: u_i = u} L_i^- \leq \sum_{(i,j)\in S(u) \cap B^c} L_{\langle ij \rangle} + \sum_{(i,j)} L_{\langle ij \rangle} + \sum_{i \leq m: u_i = u} L_i^- \leq$$

$$\sum_{(i,j)\in S(u)} \ell(u; \delta) \vee \ell_c(u; \delta) + (|B| + m) \cdot C \log N \leq$$

$$|S(u)|\ell(u; \delta) \vee \ell_c(u; \delta) + (|B| + m) \cdot C \log N,$$

where the last inequality holds on event G. By taking expectation on this event, it gets:

$$\mathbb{E}\{N(u) \cdot 1_G\} \leq \mathbb{E}\{|S(u)| \cdot 1_G\} \cdot \ell(u; \delta) \vee \ell_c(u; \delta) + (\mathbb{E}|B| + m) \cdot C \log N$$

by Lemmas D.2 and D.2, $$\mathbb{E}(|B|) \leq \quad \text{(Eq. D.23)}$$

$$m_0 n + \sum_{m_0 \leq i \leq m, j \leq n'} \mathbb{P}(\mathcal{E}_{i,j}(\ell(\delta, u_i)) \cup \mathcal{F}_{i,j}(\ell_c((\delta, u_i))) + C_m \log N \leq$$

$$m_0 n + Cm^{1-\varepsilon} n + Cm \log N \leq$$

$$\frac{CN}{(\log N)^2} \mathbb{E}(|B|) \leq Cm^{1-\varepsilon} n + Cm \log n.$$

Further $\mathbb{E}\{N(u)\} = Nr(u)$ and $\mathbb{E}\{N(u) \cdot 1_G\} \geq \mathbb{E}\{N(u)\} - N\mathbb{P}(\mathcal{G}^c)$, whence $\lim_{m,n\to\infty} \inf \frac{1}{N} \mathbb{E}\{|S(u)| \cdot 1_G\} \cdot \ell(u; \delta) \vee \ell_c(u; \delta) \geq r(u)$ Recalling the definition of $\ell(u; \delta)$, $\ell_c(u;; \delta)$ and the fact that $\delta$ is arbitrary, n the last inequality yields:

$$\lim_{m,n\to\infty} \inf \mathbb{E}\{|S(u)| \cdot 1_G\} \frac{\log_2 N}{N} \geq \quad \text{(Eq. D.24)}$$

$$r(u)\left[H(X|U=u) \wedge \left(\frac{1+\alpha}{\alpha}\right)H(X|U=u, V)\right]$$

where summing over $u$, noting that $\sum_{u \in \mathcal{L}} |S(u)| = M$, and substituting in Eq. (D.19) yields the lower bound on the rate in Eq. (5.10).

Finally, the upper bound is proved by a similar strategy as for the lower bound. Define the set of 'bad indices' $B_- = B_-(X^{m,n}, \delta) \subseteq [m] \times [n]$, $$B_-(X^{m,n}, \delta) := \quad \text{(Eq. D.25)}$$

$$\{(i,j) \in [m] \times [n] : \mathcal{E}_{i,j}^c(\ell(-\delta, u_i)) \text{ or } \mathcal{F}_{i,j}^c(\ell_c(-\delta, u_i))\}$$

It also denotes by Lt the length of the last segment in row i. It then has:

$$N(u) \geq \sum_{(i,j)\in S(u)} L_{\langle ij \rangle} - \sum_{i \leq m: u_i = u} L_i^+ \geq \sum_{(i,j)\in S(u) \cap B^c} L_{\langle ij \rangle} - \sum_{i \leq m: u_i = u} L_i^+ \geq$$

$$\sum_{(i,j)\in S(u) \cap B^c} \ell(u; -\delta) \vee \ell_c(u; -\delta) - \sum_{i \leq m: u_i = u} L_i^+ \geq$$

$$|S(u)|\ell(u; \delta) \vee \ell_c(u; \delta) - (|B_-| + m) \cdot C \log N$$

where the last inequality holds on event G. By taking expectation on this event, it gets:

$$\mathbb{E}\{N(u) \cdot 1_G\} \geq \mathbb{E}\{|S(u)| \cdot 1_G\} \cdot \ell(-\delta, u) \vee \ell_c(-\delta, u) - (\mathbb{E}|B_-| + m) \cdot C \log N$$

By Lemmas D.2 and D.2, $$\mathbb{E}(|B_-|) \leq m_0 n + \sum_{m_0 \leq i \leq m, j \leq n'} \mathbb{P}(\mathcal{E}_{i,j}^c(\ell(-\delta, u_i)) \cup \mathcal{F}_{i,j}^c(\ell_c(-\delta, u_i))) + C_m \log N \leq$$

$$m_0 n + Cm^{1-\varepsilon_n} + C_m \log N \leq \frac{CN}{(\log N)^2}$$

The proof is completed exactly as for the lower bound.

Proof of Lemma D.2

The following standard lemmas are used.

Lemma D.4. Let X be a centered random variable with $\mathbb{P}(X \leq x_0) = 1$, $x_0 > 0$. Then, lettings $$c(x_0) = (e^{x_0} - 1 - x_0)/x_0^2,$$

it has:

$$\mathbb{E}(e^X) \leq 1 + c(x_0)\mathbb{E}(X^2) \quad \text{(Eq. D.26)}$$

Proof. This simply follows from $\exp(x) \leq 1 + x + c(x_0)x^2$ for $x \leq x_0$.

Lemma D.5. Let $(P_i)_{i\geq 1}$, $(q_i)_{i\geq 1}$, be probability distributions on $\mathcal{X}$ with $\sup_{i\geq 1} \max_{x\in\mathcal{X}} P_i(x) \leq 1-c$, and $\sup_{i\geq 1} \in_{x\in\mathcal{X}} P_i(x)^2 (\log p_i(x))'' \leq C$ for constants c, C.

Let be $(X_i)_{i\geq \ell}$ be independent random variables with $X_i \sim p_i$, and set $X = (X_1, \ldots X_\ell)$. Let $Y(j) \in \mathcal{X}^\ell$, $j \geq 1$ be a sequence of i.i.d. random vectors, with $(Y_i(j))_{i\leq \ell}$ independent and $(Y_i(j)) \sim q_i$. Finally, let $T := \min \{t \geq 1: Y(t) = X\}$.

Then, for any $\varepsilon > 0$, there exists $\delta = \delta(\Sigma, c, C) > 0$ such that (letting):

$$\bar{H}(p) := \ell^{-1} \sum_{i=1}^{\ell} H(p_i)):$$

$$\mathbb{P}\left(T \leq e^{\ell[\bar{H}(p)-\varepsilon]}\right) \leq e^{-\delta \ell} \quad \text{(Eq. D.27)}$$

Further, the same bound holds (with a different $\delta(\varepsilon, c, C))(Y(j))_{j\geq 1}$ are independent not identically distributed, if there exist a finite set $$(q_i^a)_{i\geq 1, a\in[K]}, K \leq \ell^{C_o},$$

and a map $b: \mathbb{N} = \to [K]$ such that $$Y(j) \sim q_1^{b(j)} \otimes \ldots \otimes q_\ell^{b(j)}.$$

Proof. It denotes by Y a vector distributed as Y(i). Conditional on $X = x$, T is a geometric random variables with mean $1/(1-\mathbb{P}(Y=x))$. Hence, for the $t_\ell(\varepsilon) := e^{\ell[\bar{H}(p)-\varepsilon]}$, $$\mathbb{P}(T \leq t_\ell(\varepsilon)|X=x) = 1-(1-\mathbb{P}(Y=x))^{t_\ell(\varepsilon)} \leq t_\ell(\varepsilon)\mathbb{P}(Y=x)$$

Hence, $$\mathbb{P}(T \leq t_\ell(\varepsilon)) \leq e^{-\ell\varepsilon/2} + \mathbb{P}(\mathbb{P}(Y=X|X) \geq t_\ell(\varepsilon/2)^{-1}) \quad \text{(Eq. D.28)}$$

$$= e^{-\ell\varepsilon/2} + P_\ell(\varepsilon/2) \quad \text{(Eq. D.29)}$$

$$P_\ell(u) := \mathbb{P}\left(\sum_{i=1}^{\ell} \log\frac{1}{q_i(X_i)} < \sum_{i=1}^{\ell} H(p_i) - \ell u\right) \quad \text{(Eq. D.30)}$$

By Chernoff bound, for any $\lambda \geq 0$, $P_\ell(u) \leq \exp\{-\ell\phi(\lambda, u)\}$, where:

$$\phi(\lambda, u) := \lambda u - \frac{1}{\ell}\sum_{i=1}^{\ell}\left[\lambda H(p_i) + \log \mathbb{E}[q_i(X_i)^\lambda]\right] \quad \text{(Eq. D.31)}$$

By Holder inequality, for $\lambda \in [0, 1]$ we have $\mathbb{E}[q_i(X_i)^\lambda] \leq (\Sigma_x p(x)^\beta)^{1/\beta}$ where $\beta = 1(1-\lambda)$. Therefore, $$\psi(\lambda; p) := \lambda H(p) + (1-\lambda)\log\left(\sum_{x\in\mathcal{X}} p(x)^{1/(1-\lambda)}\right) =$$

-continued $$(1-\lambda)\log \mathbb{E}_{X\sim p}\exp\left(\frac{\lambda}{1-\lambda}(\log p(X) + H(p))\right)$$

Consider the random variable $$Z_i := \frac{\lambda}{1-\lambda}(\log p_i(X_i) + H(p))$$

where $X_i \sim P_i$. Under the assumptions of the lemma, for $\lambda \in [0, 1/2]$ it has $\mathbb{E}(Z_i) = 0$:

$$Z_i \leq \log(1-c) + H(p) \leq \log[|\mathcal{X}|(1-c)] \quad \text{(Eq. D.32)}$$

$$\mathbb{E}[Z_i^2] \leq \left(\frac{\lambda}{1-\lambda}\right)^2 \sum_{x\in\mathcal{X}} p_i(x)(\log p_i(x))^2 \leq 4C\lambda^2 \quad \text{(Eq. D.33)}$$

Using Lemma D.4, it gets:

$$\psi(\lambda; p_i) = (1-\lambda)\log \mathbb{E}e^{Z_i} \quad \text{(Eq. D.34)}$$

$$\leq (1-\lambda)\log\left(1 + c_0\mathbb{E}(Z_i^2)\right) \quad \text{(Eq. D.35)}$$

$$\leq \log(1 + c_*\lambda^2) \quad \text{(Eq. D.36)}$$

whence $$\phi(\lambda, u) \geq \lambda u - \log(1 + c_*\lambda^2)$$

By maximizing this expression over $\lambda$, we find that $P_\ell(\varepsilon/2) \leq \exp(-\delta_0(\varepsilon)\ell)$ which completes the proof for the case of i.i.d. vectors Y(j).

The case of non-identically distributed vectors follows by union bound over $\alpha \in [K]$ Lemma D.6. Let $(p_i)_{i\geq 1}$, be probability distributions on x, with $\sup_{i\geq 1}\max_{x\in\mathcal{X}} P_i(x) \leq 1-c$, and $\sup_{i\geq 1} \mathbb{E}_{x\in\mathcal{X}} P_i(x)(\log p_i(x))'' \leq C$ for constants c, C.

Let $(X_i)_{i\geq 1}$ be independent random variables with $X_i \sim p_i$, $X = (X_1, \ldots, X_\ell)$. Let $Y(j) \in \mathcal{X}^\ell$, $j \geq 1$ be a sequence of i.i.d. copies of X. Finally, let $T = \min \{t \geq 1: Y(t) = X\}$.

Then, for any $\varepsilon > 0$, there exists $\delta = \delta(\varepsilon, c, C) > 0$, such that $$\left(\text{letting } \bar{H}(p) := \ell^{-1}\sum_{i=1}^{\ell} H(p_i)\right): \mathbb{P}\left(T \geq e^{\ell[\bar{H}(p)+\varepsilon]}\right) \leq e^{-\delta \ell} \quad \text{(Eq. D.37)}$$

Proof. The proof follows the same argument as for Lemma D.5. Denote by Y a vector distributed as Y(i), and define $t_\ell(\varepsilon) := e^{\ell[\bar{H}(p)+\varepsilon]}$ $$\mathbb{P}(T \geq t_\ell(\mathcal{E})|X=x) = (1 - \mathbb{P}(Y=x))^{t_\ell(\varepsilon)} \leq \exp(-t_{\ell(\varepsilon)}\mathbb{P}(Y=x))$$

Hence, $$\mathbb{P}(T \geq t_\ell(\varepsilon)) \leq \exp\{e^{\ell\varepsilon/2}\} + \mathbb{P}(\mathbb{P}(Y=X|X) \leq t_\ell(\varepsilon/2)^{-1}) \quad \text{(Eq. D.38)}$$

$$\leq e^{\ell\varepsilon/2} + \tilde{P}_\ell(\varepsilon/2) \quad \text{(Eq. D.39)}$$

-continued $$\tilde{P}_\ell(u) := \mathbb{P}\left(\sum_{i=1}^{\ell} \log \frac{1}{p_i(X_i)} \geq \sum_{i=1}^{\ell} H(p_i) + \ell u\right) \quad \text{(Eq. D.40)}$$

It claims that, for each $u > 0$, $\tilde{P}_\ell(u) \leq e^{-\delta_0(u)\ell}$ for some $\delta_0(u) > 0$. Using again Chernoff's bound, it gets, for any $\lambda > 0$, $\tilde{P}_\ell(u) \leq e^{-\ell\tilde{\phi}(\lambda, u)}$, where:

$$\tilde{\phi}(\lambda, u) := \lambda u - \frac{1}{\ell}\sum_{i=1}^{\ell}\tilde{\psi}(\lambda; p_i) \quad \text{(Eq. D.41)}$$

$$\tilde{\psi}(\lambda; p_i) := \log \mathbb{E}\, \exp(\lambda W_i),\ W_i := \log\frac{1}{p_i(X_i)} - H(p_i) \quad \text{(Eq. D.42)}$$

where in the last line $X_i \sim P_i$. Under the assumptions of the lemma, $W_i \leq C$ almost surely and applying again Lemma D.4, it gets $\tilde{\psi}(\lambda; p_i) \leq \log(1+c_*\lambda^2)$ for $\lambda \leq 1$. The proof is completed by selecting for each $u > 0$, $\lambda > 0$ so that $\lambda u - \log(1+c_*\lambda^2) > 0$.

It is ready to prove Lemma D.2.

Proof of Lemma D.2. It begin by proving the bound (D.8). Fix $i \leq m$, $j \leq n'$, $u \in \mathcal{L}^m$, $\delta > 0$, and write $\ell = \ell(\delta, u_i)$. Define $R_{ij} := \{i,j'\}$: $\max(1, j-1) \leq j' \leq j-1\}$ and $S_{ij} = \{','j'\}$: $\{' < i$ or $i'=i, j'<j-1\}$. Finally, for $t \in \{0, \ldots, l-1\}$, let $S_{ij}(t) = S_{ij} \cap \{i', j'\}: \{i'j' \geq t \mod l\}$.

By union bound, $$\mathbb{P}(\mathcal{E}_{i,j}(\ell)\,|\,u) \leq A + \sum_{t=0}^{\ell-1} B(t)$$

$$A := \sum_{(rs) \in R_{ij}} \mathbb{P}\left(X_{\langle rs \rangle}^{\langle rs \rangle+\ell-1} = X_{\langle ij \rangle}^{\langle ij \rangle+\ell-1}\,\Big|\,u\right)$$

$$B(t) := \mathbb{P}\left(\exists\, (r,s) \in S_{ij}(t): X_{\langle rs \rangle}^{\langle rs \rangle+\ell-1} = X_{\langle ij \rangle}^{\langle ij \rangle+\ell-1}\,\Big|\,u\right)$$

Now, by the bound of Eq. (D.4), $$A \leq \ell \cdot (1-c)^\ell \leq C N^{-\varepsilon} \quad \text{(Eq. D.43)}$$

for suitable constants $C_{,\varepsilon}$.

Next, for any $t \in \{0, \ldots, l-1\}$, the vectors $$\{X_{\langle rs \rangle}^{\langle rs \rangle+\ell-1}\}$$

are mutually independent and independent of $$\{X_{\langle ij \rangle}^{\langle ij \rangle+\ell-1}\}.$$

Conditional on u, the coordinates of $$X_{\langle rs \rangle}^{\langle rs \rangle+\ell-1} = (x_{\langle rs \rangle}, \ldots, x_{\langle rs \rangle+\ell-1})$$

are independent with marginal distributions $X_{\langle r's' \rangle} \sim Q_{x|u}(\cdot\,|u_{r'})$ (note that independence of the coordinates holds because $l < m/2$ and therefore $$X_{\langle rs \rangle}^{\langle rs \rangle+\ell-1}$$

does not include two entries in the same column). Note that the collection of marginal distributions $Q_{x|u}(\cdot\,|\,u)$, $u \in \mathcal{L}$ satisfies the conditions of Lemma D.5 by assumption. Further, the vector $$X_{\langle rs \rangle}^{\langle rs \rangle+\ell-1}$$

can have at most one of $K = |\mathcal{L}|^2(\ell+1)$ distributions (depending on the latents value and the occurrence of a line break in the block.)

Applying Lemma D.5, it obtains:

$$B(t) \leq e^{-\varepsilon_0 \ell} \leq C N^{-\varepsilon} \quad \text{(Eq. D.44)}$$

Summing over $t \in \{0, \ldots, \ell-1\}$ and adjusting the constants yields the claim (D.8).

Next consider the bound (D.9). Fix $u \in \mathcal{L}^m$, $i \leq m$, $j \leq n'$, and write $\ell = \ell(-\delta, u_i)$ for brevity below:

$$\mathbb{P}(\mathcal{E}_{i,j}^C(\ell)|u) \leq \quad \text{(Eq. D.45)}$$

$$\mathbb{P}\left(\forall\,(i',j') \in S_{ij}(t) \text{ s.t. } u_{i'} = u_i, j' < n': X_{\langle i'j' \rangle}^{\langle i'j' \rangle+\ell-1} \neq X_{\langle ij \rangle}^{\langle ij \rangle+\ell-1}\,\Big|\,u\right)$$

Here, $t \in \{0, \ldots, \ell-1\}$ can be chosen arbitrarily. Let $S_{ij}(t;u) = \{i', j'\} \in S_{ij}(t) \text{ s. t. } u_{i'} = u_i, j' < n'\}$ Conditional on u, the vectors $$\left(X_{\langle i'j' \rangle}^{\langle i'j' \rangle+\ell-1}\right)_{(i',j') \in S_{ij}(t;u)}$$

are i.i.d. and independent of $$X_{\langle ij \rangle}^{\langle ij \rangle+\ell-1}.$$

Further, they are distributed as $$X_{\langle ij \rangle}^{\langle ij \rangle+\ell-1}$$

Finally, $$N_{ij}(u) := |S_{ij}(t;u)| \geq \frac{n(m_i(u) - C\log N)}{\ell} \geq \frac{m_i(u)n}{C \log N} - C'n$$

where $m_i(u)$ is the number rows $i' < i$ such that $u_{i'} = u$. Since $i \geq i$ and $\mathbb{P}(u_{i'} = u) \geq \min_{u'} r(u') > 0$, by Chernoff bound there exist constants $C$, $c_0$ such that, for all m, n large enough (since $i \geq m_0$):

$$\mathbb{P}\left(N_{ij}(u) \geq \frac{c_0 m_0 n}{\log N}\right) \geq 1 - Ce^{-m_0/C} \quad \text{(Eq. D.46)}$$

Further, for any $\delta > 0$ we can choose positive constants $\varepsilon_0$, $\varepsilon_1 > 0$ such that the following holds for all $m$, $n$, large enough:

$$\frac{c_0 m_0 n}{\log N} \geq N^{1-\varepsilon_1} \geq e^{\ell[H(X|U=u_i)+\varepsilon_0]} \quad \text{(Eq. D.47)}$$

Let $T_{ij}$ be the rank of the first (i', j') in the set defined above such that $$X_{\langle i'j' \rangle}^{\langle i'j' \rangle+\ell-1} = X_{\langle ij \rangle}^{\langle ij \rangle+\ell-1},$$

and $T_{ij} = \infty$ if no such vector exists. It can continue from Eq. (D.45) to get:

$$\mathbb{P}(\mathcal{E}_{i,}^c(\ell)) \leq \mathbb{P}(T_{ij} \geq N_{ij}(u)) \leq$$
$$\mathbb{P}\left(T_{ij} \geq N_{ij}(u); \geq N_{ij}(u) \geq e^{\ell[H(X|U=u_i)+\varepsilon_0]}\right) + Ce^{-m_0/C} \underset{(a)}{\leq}$$
$$\exp\left\{-\delta_0 \min_{u \in \mathcal{L}}(\ell(-\delta;u))\right\} + Ce^{-m_0/C} \leq CN^{-\varepsilon}$$

where in ($\alpha$) it used Lemma D.6. This completes the proof of Eq. (D.9).

Proof of Lemma D.3

It begins by considering the bound (D.10).

Fix $i \leq m$, $j \leq n'_c$, $\boldsymbol{u} \in \mathcal{L}^m$, $v \in \mathcal{L}^n$, $\delta > 0$, and write $\ell = \ell_c(\delta, u_i)$, $n' = n'_c$. By union bound:

$$\mathbb{P}(\mathcal{F}_{i,j}(\ell) \mid u, v) = \mathbb{P}\left(\bigcup_{s \in [n], |j-s| < \ell} B(s) \mid u, v\right)$$
$$B(s) := \left\{\exists r < i : X_{\langle rs \rangle}^{\langle rs \rangle+\ell-1} = X_{\langle ij \rangle}^{\langle ij \rangle+\ell-1}\right\}$$

Note that for a fixed s, and conditional on u, v, the vectors $$\left(X_{\langle rs \rangle}^{\langle rs \rangle+\ell-1}\right)_{1 \leq s \leq i-1}$$

are mutually independent and independent of $$X_{\langle ij \rangle}^{\langle ij \rangle+\ell-1}.$$

Further, $$X_{\langle rs \rangle}^{\langle rs \rangle+\ell-1}$$

has independent coordinates with marginals $X_{\langle r's' \rangle} \sim Q_{X|U}(\cdot \mid u_{r'} v_{s'})$, (recall that we are conditioning both on $\boldsymbol{u}$ and v). In particular, the marginal distributions satisfy the assumption of Lemma D.5 and the law of $$X_{\langle rs \rangle}^{\langle rs \rangle+\ell-1}$$

can take one of $K = |\mathcal{L}|^2(\ell+1)$ possible values. Letting i-T(s) the last row at which $$X_{\langle rs \rangle}^{\langle rs \rangle+\ell-1} = X_{\langle ij \rangle}^{\langle ij \rangle+\ell-1}$$

(with $T(s) \geq i$ if no such row exists), it has, for some constants $C, c_0 > 0$, $$\mathbb{P}(\mathcal{F}_{i,j}(\ell)|u,v) \leq \mathbb{P}\left(\bigcup_{s \in [n], |j-s| < \ell} \{T(s) \leq i-1\} \cap \{i-1 \leq e^{\ell[\bar{H}-\varepsilon]}\} \mid u, v\right) + 1\left(i - 1 \geq e^{\ell[\bar{H}-\varepsilon]}\right) \underset{(a)}{\leq} 2\ell e^{-\ell\varepsilon} + 1\left(m > e^{\ell[\bar{H}-\varepsilon]}\right) \leq Cm^{-c_0\varepsilon} + 1\left(m > e^{\ell[\bar{H}-\varepsilon]}\right)$$

where in (a) it used Lemma D.5, and it defined $$\bar{H} := \ell^{-1} \sum_{k=j}^{j+\ell-1} H(X \mid U = u_i, V = v_k).$$

Taking expectation with respect to v, it gets:

$$\mathbb{P}(\mathcal{F}_{i,j}(\ell) \mid u) \leq$$
$$Cm^{-c_0\varepsilon} + \mathbb{P}\left(\frac{1}{\ell}\sum_{k=j}^{j+\ell-1} H(X \mid U=u_i, V=v_k) < \frac{1}{1+\delta}(H(X \mid U=u_i, V) + \varepsilon)\right) \underset{(a)}{\leq}$$
$$Cm^{-c_0\varepsilon} + e^{-\ell\varepsilon} \leq C'm^{-c_0\varepsilon}$$

where in ($\alpha$) it used Chernoff bound. This completes the proof of Eq. (D.10).

Finally, the proof Eq. (D.11) is similar to the one of Eq. (D.9). It fixes $\boldsymbol{u} \in \mathcal{L}^m$, $i \leq m$, $j \leq n'_c$, and writes $\ell = \ell_c(-\delta, u_i)$.

$$\mathbb{P}(\mathcal{F}_{i,j}^c(\ell) \mid u) \leq \mathbb{p}\left(\forall_i' < iu_{i'} = u_i : X_{\langle i'j \rangle}^{\langle i'j \rangle+\ell-1} \neq X_{\langle ij \rangle}^{\langle ij \rangle+\ell-1} \mid u\right) \quad \text{(Eq. D. 48)}$$

Let $$S_{ij}^c(u) := \{(i', j) \text{ s.t. } u_{i'} = u_i, i' < i\}.$$

Conditional on $\boldsymbol{u}$, v, the vectors $$\left(X_{\langle i'j' \rangle}^{\langle i'j' \rangle+\ell-1}\right)_{(i',j') \in S_{ij}^c(u)}$$

are i.i.d. and independent copies of $$X_{\langle ij \rangle}^{\langle ij \rangle+\ell-1}.$$

Finally, $$N_i^c(u) := |S_{ij}^c(u)|$$

is the number rows i'<i such that $u_{i'} = u$. By Chernoff bound there exist constants C, c0 such that, for all m, n large enough (recalling it needs only to consider $i \geq m_0$):

$$\mathbb{P}(N_i^c(u) \geq c_0 m_0) \geq 1 - Ce^{-m_0/C} \quad \text{(Eq. D.49)}$$

Since $m_0 \geq m^{1-o_n(1)}$, for any $\delta > 0$ it can choose constants $\varepsilon_0$, $\hat{u}_{i,1} > 0$ so that:

$$c_0 m_0 \geq m^{1-\varepsilon_1} \geq e^{\ell [H(X|U=u_i, V)+2\varepsilon_0]} \quad \text{(Eq. D.50)}$$

Recall the definition $$\bar{H} := \ell^{-1} \sum_{k=j}^{j+\ell-1} H(X \mid U = u_i, V = v_k).$$

By an an application of Chernoff bound:

$$\mathbb{P}\left(N_i^c(u) \geq e^{\ell [H(X|U=u_i, V)+\varepsilon_0]}\right) \geq 1 - Cm^{-\varepsilon} - Ce^{-m_0/C} \quad \text{(Eq. D.51)}$$

Let $T_i$ be the rank of the first i' in the set defined above such that $$X_{(i'j)}^{(i'j)+\ell-1} = X_{(ij)}^{(ij)+\ell-1},$$

and $T_i = \infty$ if no such vector exists. From Eq. (D.48) it gets:

$$\mathbb{P}(\mathcal{F}_{ij}^c(\ell)) \leq \mathbb{P}(T_i \geq N_i(u)) \leq$$

$$\mathbb{P}\left(T_i \geq N_i(u); N_i(u) \geq e^{\ell [H(X|U=u_i, V)+\varepsilon_0]}\right) + Cm^{-\varepsilon}(a) \leq$$

$$\exp\{-\delta_{u \in \mathcal{L}}^{\min}(\ell_c(-\delta; u))\} + Cm^{-\varepsilon} \leq 2Cm^{-\varepsilon}$$

where in (a) it used Lemma D.6.

E Proofs for Latent-Based Encoders

Proof of Lemma 5.4

General bound (5.15)

Define the 'ideal' expected compression rate (e.g., the rate achieved by a compressor that is given the latents):

$$R_\# := \frac{1}{mn \log_2 |\mathcal{X}|}$$

$$\left\{\mathbb{E}[len(\text{header})] + \mathbb{E}[len(Z(u))] + \mathbb{E}[len(Z(v))] + \sum_{u,v \in \mathcal{L}} \mathbb{E}[len(Z(X(u,v)))]\right\}$$

Since $R_{lat}(X) \leq 1$ by construction, it has:

$$\mathbb{E} R_{lat}(X) \leq \mathbb{E}\left\{R_{lat}(X) \mathbf{1}_{\hat{A}_{U(X;\hat{u})=1}} \mathbf{1}_{\hat{A}_{V(X;\hat{v})=1}}\right\} +$$

$$\mathbb{P}(\hat{A}_U(X, \hat{u}) < 1) + \mathbb{P}(A_V(X; v) < 1)(*) \leq R_\# + \mathbb{P}(\hat{A}_V(X; v) < 1)$$

where in step (*) we bounded $\mathbb{E}[len(Z(\hat{u}))]\mathbf{1}_{\hat{A}_{U(X;\hat{u})=1}} = \mathbb{E}[len(Z(u))]\mathbf{1}_{\hat{A}_{U(X;\hat{u})=1}} \leq \mathbb{E}[len(Z(u))]$, because, on the event $\{\hat{A}_U(X; \hat{u})=1\}$, $\hat{u}$ coincides with $u$ up to relabelings, and the compressed length is invariant under relabelings. Similar arguments were applied to $len(Z(v))$ and $len(Z(X(u,v)))$.

It follows, by the definition of $\Delta_z(N; k)$ in Eq. (5.19), $$\frac{\mathbb{E}[len(Z(u))]}{mn \log_2 |\mathcal{X}|} \leq \frac{H(U)}{n \log_2 |\mathcal{X}|} + \frac{1}{n} \Delta_z(m \wedge n; \{r, c\}) \quad \text{(Eq. E.1)}$$

$$\frac{\mathbb{E}[len(Z(v))]}{mn \log_2 |\mathcal{X}|} \leq \frac{H(V)}{n \log_2 |\mathcal{X}|} + \frac{1}{m} \Delta_z(m \wedge n; \{r, c\}) \quad \text{(Eq. E.2)}$$

$$\frac{\mathbb{E}[len(Z(x(u,v))) \mid u, v]}{mn \log_2 |\mathcal{X}|} \leq \quad \text{(Eq. E.3)}$$

$$\hat{r}(u)\hat{c}(v) \frac{H(X \mid U = u, V = v)}{\log_2 |\mathcal{X}|} + \Delta_z(c \cdot mn; \{Q(\cdot \mid u, v)\}_{i,v \in \mathcal{L}})$$

where in the last line $\hat{\imath}$ is the empirical distribution of the row latents and $\hat{e}$ is the empirical distribution of the column latents. By taking expectation in the last expression, it gets:

$$\sum_{u,v \in \mathcal{L}} \frac{\mathbb{E}[len(Z(x(u,v))) \mid u, v]}{mn \log_2 |\mathcal{X}|} \leq \quad \text{(Eq. E.4)}$$

$$\frac{H(X \mid U, V)}{\log_2 |\mathcal{X}|} + |\mathcal{L}|^2 \Delta_2(c \cdot mn; \{Q(\cdot u, v)\}_{u,v \in \mathcal{L}})$$

Finally, the header contains $|\mathcal{L}|^2 + 2$ integers of maximum size $mn$, whence $len(\text{header}) \leq 4 \log_{2(mn)}$. It concludes that:

$$R_\# \leq \frac{1}{\log_2 |x|} \left\{H(X \mid U, V) + \frac{1}{n} H(U) + \frac{1}{n} H(V)\right\} +$$

$$\frac{2 \log_2(mn)}{mn} + |\mathcal{L}|^2 \Delta_Z(c \cdot mn; \{Q(\cdot \mid u, v)\}_{u,v \in \mathcal{L}}) + 2\Delta_Z(m \wedge n; \{r, c\})$$

The claim (5.15) follows from the first bound in Eq. (5.2) noticing that, under the stated assumptions on $m$, $n$, $$\frac{1}{n}[h(\varepsilon_U) + \varepsilon_u \log(|\mathcal{L}| - 1)] \leq \varepsilon_U \leq \mathbb{P}(\hat{A}_U(X^{m,n}; \hat{u}) < 1) \quad \text{(Eq. E.5)}$$

Overheads of specific encoders: Eqs. (5.16)-(5.5).

LZ coding. Let $X^N = (X_1, \ldots, X_N)$ be a vector with i.i.d. symbols $X_i \sim q$ with q a probability distribution over $\mathcal{X}$. There are two important differences with the analysis above: data are i.i.d. (not matrix structured) and it is desirable to derive a sharper estimate (not just the entropy term but bounding the overhead as well).

It defines $L_k(X^N)$, $T_k(X^N)$, and lets $(k(1), \ldots, k(M))$ be the values taken by k in the while loop of the Lempel-Ziv pseudocode. In particular, $$k(1) = 1 \quad \text{(Eq. E.6)}$$

$$k(\ell + 1) = k(\ell) + L_{k(\ell)}(X^N) \quad \text{(Eq. E.7)}$$

$$k(M) = N \quad \text{(Eq. E.8)}$$

Therefore, the total length of the code is:

$$len(LZ(X^N)) = M\lceil \log_2(N + |\mathcal{X}|)\rceil + \sum_{\ell=1}^{M} len(elias(L_{k(\ell)})) \le \quad \text{(Eq. E.9)}$$

$$M\lceil \log_2(N + |\mathcal{X}|)\rceil + 2\sum_{\ell=1}^{M} \log_2(L_{k(\ell)})$$

$$\le M\lceil \log_2(N + |\mathcal{X}|)\rceil + 2 M \log_2(N/M) \quad \text{(Eq. E.10)}$$

where the last step follows by Jensen's inequality. By one more application of Jensen, $$\mathbb{E}R_{LZ}(X^N) \le \frac{1}{\log_2|\mathcal{X}|} \cdot \frac{\mathbb{E}M}{N}, \{\log_2(N + |\mathcal{X}|) + 2\log_2(N/\mathbb{E}M)\} \quad \text{(Eq. E.11)}$$

For $\ell \in \mathbb{N}$, define the set of bad positions as:

$$B(\ell) := \{k \in \lfloor N \rfloor : L_k(X^N) \le \ell\} \quad \text{(Eq. E.12)}$$

whence, $$N = \sum_{j=1}^{M} L_{k(j)} \ge (M - |B(\ell)|)\ell \quad \text{(Eq. E.13)}$$

and therefore, for any $c \in (0, 1)$:

$$\frac{\mathbb{E}M}{N} \le \frac{1}{\ell} + \frac{1}{N}\sum_{k=1}^{N} \mathbb{P}(L_k(X^N) \le \ell) \quad \text{(Eq. E.14)}$$

$$\le \frac{1}{\ell} + N^{-1+c} + \frac{1}{N}\sum_{k=N^c}^{N} \mathbb{P}(L_k(X^N) \le \ell) \quad \text{(Eq. E.15)}$$

Certain Definitions

While various embodiments of the invention have been shown and described herein, it will be obvious to those skilled in the art that such embodiments are provided by way of example. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The present disclosure uses boldface for vectors and uppercase boldface for matrices, without making any typographic distinction between numbers and random variables. The dimensions of a matrix or a vector is indicated by subscripts. For example, $u^m$ is a vector of length m, and $X^{m,n}$ is a matrix of dimensions m×n.

If X, Y are random variables on a common probability space $(\Omega, F, P)$, their entropies are denoted by H(X), H(Y), H(X, Y) denotes their joint entropy, H(X|Y) denotes the conditional entropy of X given Y.

Computer Systems

Figure 5:
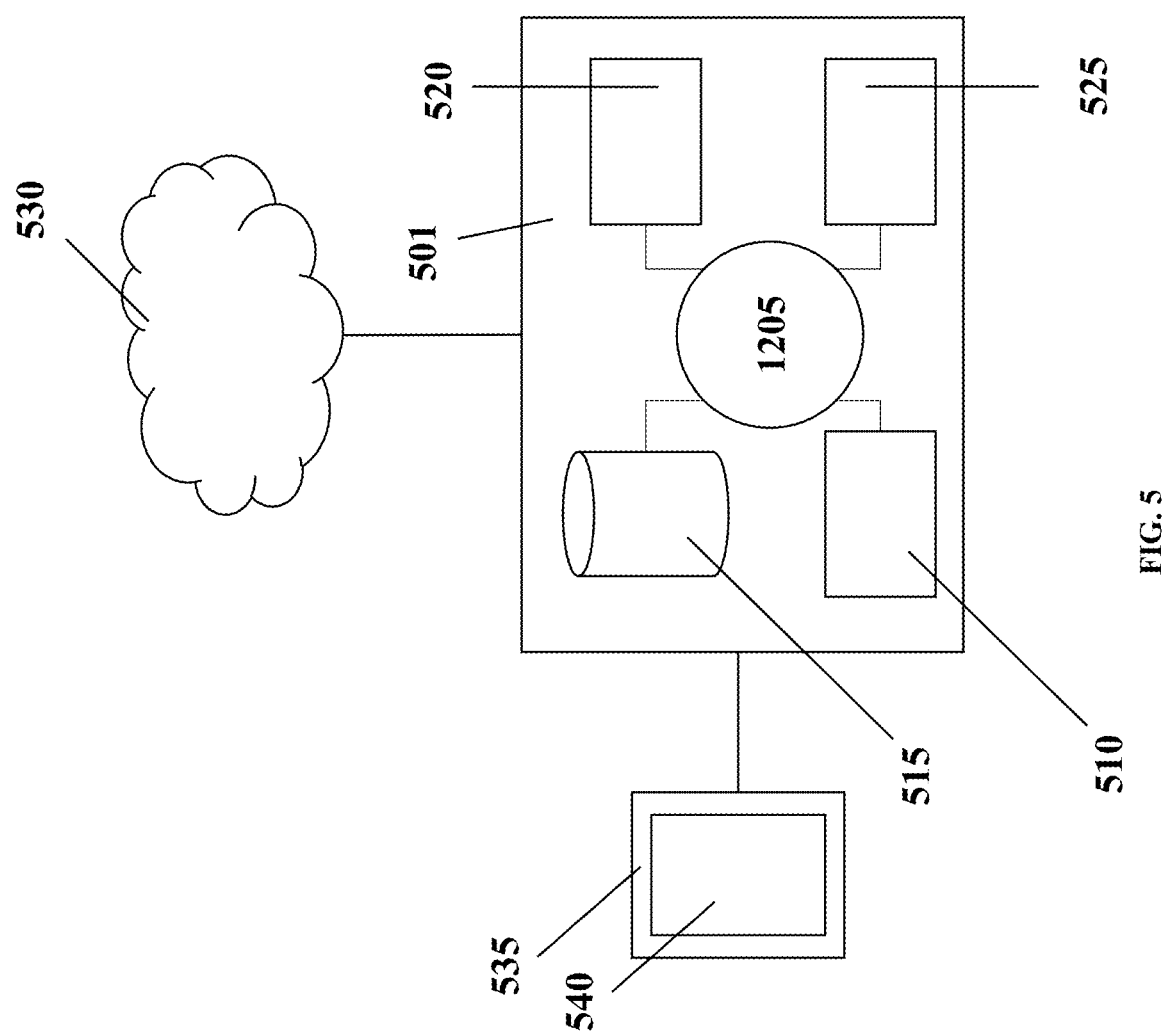
FIG. 5 shows a computer system that is programmed or otherwise configured to implement methods and algorithms provided herein, in accordance with some embodiments.

The present disclosure provides computer systems that are programmed to implement methods of the disclosure. In some cases, the data objects to be processed may be stored in a cloud via services such as Amazon AWS or Google GCP. For instance, cloud compute instances obtained through the same providers may host the "data reducers" that process data according to the methods described herein. FIG. 5 shows a computer system 501 that is programmed or otherwise configured to implement the lossless compression algorithm as described herein. The computer system 501 can regulate various aspects of processing structured or semi-structured data. For example, the computer system may execute algorithms to: (i) estimate latent variables associated to rows and columns of the table; (ii) partition the table in blocks according to the row/column latents; (iii) apply a sequential (e.g., Lempel-Ziv compression or entropy coding) to each of the blocks; (iv) append a compressed encoding of the latent. The computer system 501 can be an electronic device of a user or a computer system that is remotely located with respect to the electronic device. The electronic device can be a mobile electronic device.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user (e.g., laptop). Examples of remote computer systems include personal computers (e.g., portable PC), slate or tablet PC's (e.g., Apple® iPad, Samsung® Galaxy Tab), telephones, Smart phones (e.g., Apple® iphone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, compression results and analytics. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

While preferred embodiments of the present subject matter have been shown and described herein, it can be understood that such embodiments are provided by way of example only. Numerous variations, changes, and substitutions will now without departing from the present subject matter. It can be understood that various alternatives to the embodiments of the present subject matter described herein may be employed in practicing the present subject matter.

What is claimed is:

1. A computer-implemented method for compressing structured data or semi-structured data, comprising:
    (a) estimating latent variables associated with rows or columns of the structured data or semi-structured data;
    (b) partitioning the structured data or the semi-structured data into one or more blocks according to the latent variables;
    (c) applying a sequential encoding algorithm to each of the one or more blocks; and
    (d) appending a compressed encoding of the latent variables to the compressed encoding of each of the one or more blocks.

2. The computer-implemented method of claim 1, wherein the latent variables comprise row latent variables associated with the rows and column latent variables associated with the columns.

3. The computer-implemented method of claim 1, wherein the latent variables are estimated utilizing a spectral clustering algorithm.

4. The computer-implemented method of claim 1, wherein the latent variables are estimated using side information.

5. The computer-implemented method of claim 4, wherein the side information comprises a column datatype, a column name, or a row name.

6. The computer-implemented method of claim 1, further comprising, prior to (b), reordering the rows and columns of the structured data or semi-structured data based at least in part on the latent variables.

7. The computer-implemented method of claim 1, further comprising, prior to (c), generating a serialized block vector for each of the one or more blocks.

8. Computer-implemented method of claim 7, wherein the sequential encoding algorithm is applied to each serialized block vector.

9. The computer-implemented method of claim 8, wherein applying the sequential encoding algorithm comprises applying a first base compressor to each serialized block vector and a second base compressor to a latent variables of each serialized block vector.

10. The computer-implemented method of claim 9, wherein the first base compressor and the second base compressor are different.

11. The computer-implemented method of claim 1, wherein the structured data or semi-structured data is associated with hyperspectral imaging, image processing, quantum chemistry, or large language models.

12. The computer-implemented method of claim 1, wherein the structured data or semi-structured data is associated with tabular data.

13. The computer-implemented method of claim 1, wherein the method achieves an optimal compression rate.

14. The computer-implemented method of claim 1, wherein the method reduces a compression rate by at least about 5% compared to frequency-based entropy encoders (ANS), Lempel-Ziv encoders, or finite-state encoders.

15. A non-transitory computer readable medium comprising machine executable code that, upon execution by one or more computer processors, implements a lossless compression algorithm, comprising:
    (a) estimating latent variables associated with rows or columns of a structured data or semi-structured data;
    (b) partitioning the structured data or semi-structured data into one or more blocks according to the latent variables;
    (c) applying a sequential encoding algorithm to each of the one or more blocks; and
    (d) appending a compressed encoding of the latent variables to the compressed encoding of each of the one or more blocks.

16. The non-transitory computer readable medium of claim 15, wherein the latent variables comprise row latent variables associated with the rows and column latent variables associated with the columns.

17. The non-transitory computer readable medium of claim 15, wherein the latent variables are estimated utilizing a spectral clustering algorithm.

18. The non-transitory computer readable medium of claim 15, wherein the latent variables are estimated using side information.

19. The non-transitory computer readable medium of claim 18, wherein the side information comprises a column datatype, a column name, or a row name.

20. A computer program product for compressing structured data or semi-structured data, the computer program product comprising at least one non-transitory computer-readable medium having computer-readable program code portions embodied therein, the computer-readable program code portions comprising:
    an executable portion configured to estimate variables associated with rows or columns of the structured data or semi-structured data;
    an executable portion configured to partition the structured data or the semi-structured data into one or more blocks according to the latent variables;
    an executable portion configured to apply a sequential encoding algorithm to each of the one or more blocks; and
    an executable portion configured to append a compressed encoding of the latent variables to the compressed encoding of each of the one or more blocks.

* * * * *